United States Patent
Asai et al.

(10) Patent No.: US 10,719,615 B2
(45) Date of Patent: Jul. 21, 2020

(54) INFORMATION PROCESSING APPARATUS, READING CONTROL METHOD, AND COMPUTER READABLE STORAGE MEDIUM

(71) Applicant: Renesas Electronics Corporation, Tokyo (JP)

(72) Inventors: Yoshihiko Asai, Tokyo (JP); Takashi Kurafuji, Tokyo (JP); Yoko Kimura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 166 days.

(21) Appl. No.: 15/582,927

(22) Filed: May 1, 2017

(65) Prior Publication Data

US 2017/0357821 A1 Dec. 14, 2017

(30) Foreign Application Priority Data

Jun. 14, 2016 (JP) .................................. 2016-117711

(51) Int. Cl.
*G06F 21/00* (2013.01)
*G06F 21/62* (2013.01)
*G06F 12/14* (2006.01)
*G06F 21/30* (2013.01)

(52) U.S. Cl.
CPC ...... *G06F 21/6218* (2013.01); *G06F 12/1458* (2013.01); *G06F 21/30* (2013.01); *G06F 2212/1052* (2013.01)

(58) Field of Classification Search
CPC ................. G06F 12/1458; G06F 21/30; G06F 2212/1052
See application file for complete search history.

(56) References Cited

U.S. PATENT DOCUMENTS

| | | | |
|---|---|---|---|
| 9,430,409 B2 * | 8/2016 | Berntsen | G06F 12/0246 |
| 2005/0013154 A1 * | 1/2005 | Honda | G06F 12/0246 365/145 |
| 2005/0206353 A1 * | 9/2005 | Sengoku | G06F 21/78 323/210 |

(Continued)

FOREIGN PATENT DOCUMENTS

JP 2012-14529 A 1/2012

*Primary Examiner* — Shewaye Gelagay
*Assistant Examiner* — Michael M Lee
(74) *Attorney, Agent, or Firm* — McDermott Will & Emery LLP

(57) ABSTRACT

To provide an information processing apparatus, a reading control method, and a computer readable storage medium that can improve the secrecy of information written in a secret area compared with the case of controlling access only by authentication, the information processing apparatus includes a nonvolatile memory that has a secret area where secret information is stored, an authentication controller that authenticates access to the nonvolatile memory, a flag information storage unit that stores flag information, and a memory controller that controls access to the nonvolatile memory by using the flag information stored in the flag information storage unit. The memory controller allows reading of the secret information from the secret area when a value of the flag information is a specified value and validity of access is authenticated by the authentication controller.

7 Claims, 24 Drawing Sheets

(56) References Cited

U.S. PATENT DOCUMENTS

| | | | |
|---|---|---|---|
| 2008/0172427 A1* | 7/2008 | Ito | G06F 12/0246 |
| 2012/0005485 A1 | 1/2012 | Kambayashi | |
| 2013/0145083 A1* | 6/2013 | Suzuki | G06F 12/0246 |
| | | | 711/103 |
| 2015/0074421 A1* | 3/2015 | Nagai | H04L 9/0822 |
| | | | 713/189 |
| 2015/0106558 A1* | 4/2015 | Ito | G06F 12/1466 |
| | | | 711/103 |
| 2018/0306861 A1* | 10/2018 | Rusten | G01R 31/318575 |

* cited by examiner

| ADDRESS | bit31 | ... | ... | ... | bit0 |
|---|---|---|---|---|---|
| xxxxxx | READING CONTROL FLAG | ... | ... | ... | SECURITY PROTECTION FLAG |

| ADDRESS | bit31 | ... | bitxx | ... | bit0 |
|---|---|---|---|---|---|
| xxxxxx | AUTHENTICATION EXPECTED VALUE ||||||

| SECURITY PROTECTION FLAG | READING CONTROL FLAG | AUTHENTICATION RESULT SIGNAL | WRITE | READ |
|---|---|---|---|---|
| 1 | 1 | 1 | OK | NG |
| | | 0 | OK | NG |
| | 0 | 1 | OK | OK |
| | | 0 | OK | NG |
| 0 | 1 | 1 | NG | NG |
| | | 0 | NG | NG |
| | 0 | 1 | NG | NG |
| | | 0 | NG | NG |

Fig. 9

| SECURITY PROTECTION FLAG | READING CONTROL FLAG | AUTHENTICATION RESULT SIGNAL | WRITE | READ |
|---|---|---|---|---|
| 1 | 1 | 1 | OK | OK |
| | | 0 | OK | OK |
| | 0 | 1 | OK | OK |
| | | 0 | OK | NG |
| 0 | 1 | 1 | NG | NG |
| | | 0 | NG | NG |
| | 0 | 1 | NG | NG |
| | | 0 | NG | NG |

Fig. 12

| ADDRESS | bit31 | ... | ... | ... | bit4 | ... | bit0 |
|---|---|---|---|---|---|---|---|
| xxxxxx | READING CONTROL FLAG | ... | ... | ... | SECURITY PROTECTION FLAG (FOR BANK1) | ... | SECURITY PROTECTION FLAG (FOR BANK0) |

Fig. 17

| ADDRESS | bit31 | ... | ... | ... | bit0 |
|---|---|---|---|---|---|
| xxxxxx | ... | ... | ... | ... | BANK STRUCTURE SETTING FLAG |
| yyyyyy | ... | ... | ... | ... | EFFECTIVE BANK SETTING FLAG |

| SECURITY PROTECTION FLAG (FOR BANK0) | SECURITY PROTECTION FLAG (FOR BANK1) | READING CONTROL FLAG | AUTHENTICATION RESULT SIGNAL | SECRET AREA (bank0) WRITE | SECRET AREA (bank0) READ | SECRET AREA (bank1) WRITE | SECRET AREA (bank1) READ |
|---|---|---|---|---|---|---|---|
| 0 | 1 | 1 | 1 | NG | NG | OK | NG |
| 0 | 1 | 1 | 0 | NG | NG | OK | NG |
| 0 | 1 | 0 | 1 | NG | NG | OK | OK |
| 0 | 1 | 0 | 0 | NG | NG | OK | NG |
| 0 | 0 | 1 | 1 | NG | NG | NG | NG |
| 0 | 0 | 1 | 0 | NG | NG | NG | NG |
| 0 | 0 | 0 | 1 | NG | NG | NG | NG |
| 0 | 0 | 0 | 0 | NG | NG | NG | NG |

Fig. 24

| SECURITY PROTECTION FLAG (FOR BANK0) | SECURITY PROTECTION FLAG (FOR BANK1) | READING CONTROL FLAG | AUTHENTICATION RESULT SIGNAL | SECRET AREA (bank0) WRITE | SECRET AREA (bank0) READ | SECRET AREA (bank1) WRITE | SECRET AREA (bank1) READ |
|---|---|---|---|---|---|---|---|
| 0 | 1 | 1 | 1 | NG | NG | OK | OK |
| 0 | 1 | 1 | 0 | NG | NG | OK | OK |
| 0 | 1 | 0 | 1 | NG | NG | OK | OK |
| 0 | 1 | 0 | 0 | NG | NG | OK | NG |
| 0 | 0 | 1 | 1 | NG | NG | NG | NG |
| 0 | 0 | 1 | 0 | NG | NG | NG | NG |
| 0 | 0 | 0 | 1 | NG | NG | NG | NG |
| 0 | 0 | 0 | 0 | NG | NG | NG | NG |

Fig. 26

| SECURITY PROTECTION FLAG (FOR BANK0) | SECURITY PROTECTION FLAG (FOR BANK1) | READING CONTROL FLAG | AUTHENTICATION RESULT SIGNAL | SECRET AREA (bank0) | | | SECRET AREA (bank1) | | |
|---|---|---|---|---|---|---|---|---|---|
| | | | | ERASE | WRITE | READ | ERASE | WRITE | READ |
| 0 | 1 | 1 | 1 | NG | NG | NG | NG | OK | NG |
| 0 | 1 | 1 | 0 | NG | NG | NG | NG | OK | NG |
| 0 | 1 | 0 | 1 | NG | NG | NG | OK | OK | OK |
| 0 | 1 | 0 | 0 | NG | NG | NG | NG | OK | NG |
| 0 | 0 | 1 | 1 | NG | NG | NG | NG | NG | NG |
| 0 | 0 | 1 | 0 | NG | NG | NG | OK | NG | NG |
| 0 | 0 | 0 | 1 | NG | NG | NG | NG | NG | NG |
| 0 | 0 | 0 | 0 | NG | NG | NG | NG | NG | NG |

INFORMATION PROCESSING APPARATUS, READING CONTROL METHOD, AND COMPUTER READABLE STORAGE MEDIUM

CROSS-REFERENCE TO RELATED APPLICATIONS

This application is based upon and claims the benefit of priority from Japanese patent application No. 2016-117711, filed on Jun. 14, 2016, the disclosure of which is incorporated herein in its entirety by reference.

BACKGROUND

The present invention relates to an information processing apparatus, a reading control method, and a computer readable storage medium and, for example, relates to an information processing apparatus that makes access to a nonvolatile memory having a secret area, a reading control method, and a computer readable storage medium.

A program executed by a microcomputer or the like is generally developed by a plurality of developers (e.g., a primary developer, a secondary developer etc.) and stored into a data storage unit. In the case where secrecy is demanded for a program created by the primary developer, for example, it is necessary to prevent this program from being read by the secondary developer.

On the other hand, a technique that requires authentication for access to data is known. For example, a storage device unit that includes a data storage unit having a secret area and an authentication unit is disclosed in Japanese Unexamined Patent Publication No. 2012-14529. This secret area becomes readable when authentication using reading authentication information is successful, and it becomes writable when authentication using writing authentication information is successful.

SUMMARY

However, in the technique described in Japanese Unexamined Patent Publication No. 2012-14529, anyone who knows reading authentication information can read a program with a high level of secrecy written in the secret area.

The other problems and novel features of the present invention will become apparent from the description of the specification and the accompanying drawings.

According to one embodiment, an information processing apparatus includes a memory controller that allows reading of secret information from a secret area when a value of flag information is a specified value and validity of access is authenticated by an authentication controller.

According to the one embodiment described above, it is possible to improve the secrecy of information written in a secret area compared with the case of controlling access only by authentication.

BRIEF DESCRIPTION OF THE DRAWINGS

The above and other aspects, advantages and features will be more apparent from the following description of certain embodiments taken in conjunction with the accompanying drawings, in which:

FIG. 9 is a table showing conditions for determination as to whether or not to allow access which is made by a memory controller according to the first embodiment.

FIG. 12 is a table showing conditions for determination as to whether or not to allow access which is made by a memory controller according to a modified example of the first embodiment.

FIG. 17 is a schematic diagram showing an example of the structure of a security data setting area according to the second embodiment.

FIG. 18 is a schematic diagram showing an example of the structure of a bank information setting area according to the second embodiment.

FIG. 19 is a table showing conditions for determination as to whether or not to allow access which is made by a memory controller according to the second embodiment.

FIG. 24 is a table showing conditions for determination as to whether or not to allow access which is made by a memory controller according to a modified example of the second embodiment.

FIG. 26 is a table showing conditions for determination as to whether or not to allow access which is made by a memory controller according to a third embodiment.

DETAILED DESCRIPTION

The following description and the attached drawings are appropriately shortened and simplified to clarify the explanation. In the figures, the identical reference symbols denote identical structural elements and the redundant explanation thereof is omitted.

Overview of Embodiments

Figure 1:
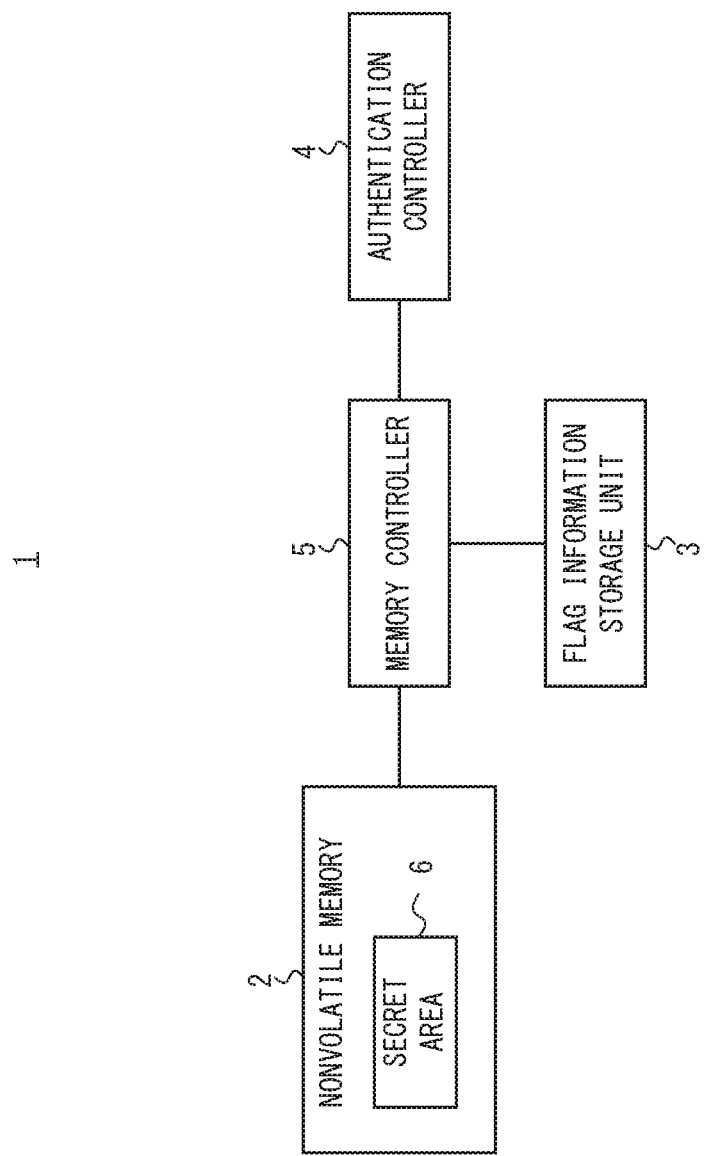
FIG. 1 is a block diagram showing a configuration example of a semiconductor device, which is an example of an information processing apparatus according to the overview of an embodiment.

Prior to describing the details of embodiments, the overview is described hereinafter. FIG. 1 is a block diagram showing a configuration example of a semiconductor device 1, which is an example of an information processing apparatus according to the overview of an embodiment. As shown in FIG. 1, the semiconductor device 1 includes a nonvolatile memory 2, a flag information storage unit 3, an authentication controller 4, and a memory controller 5.

The nonvolatile memory 2 has a secret area 6. The secret area 6 is an area where secret information is stored. Note that the secret information is information with secrecy. Note that the nonvolatile memory 2 may further have an area to store information other than secret information, not limited to the secret area 6.

The flag information storage unit 3 stores flag information that is used to determine whether or not to allow access to the nonvolatile memory 2. Note that, although the flag information storage unit 3 is a different storage device from the nonvolatile memory 2 in the configuration example shown in FIG. 1, it is not limited thereto. The flag information storage unit 3 may be implemented by the nonvolatile memory 2, may be implemented by a nonvolatile memory that is different from the nonvolatile memory 2, or may be implemented by another storage device.

In the case where the flag information storage unit 3 is implemented by the nonvolatile memory 2, the nonvolatile memory 2 further has an area to store flag information (i.e., a setting information storage area 220 which is described later). In other words, the flag information storage unit 3 may be the nonvolatile memory 2, and the flag information may be stored in an area other than from the secret area 6 of the nonvolatile memory 2. In this case, there is no need to prepare a flag information storage unit separately, and the configuration can be simplified.

The authentication controller 4 authenticates access to the nonvolatile memory 2. For example, the authentication controller 4 conducts authentication by determining whether authentication information that is input to the authentication controller 4 satisfies specified conditions or not. The authentication controller 4 outputs an authentication result to the memory controller 5.

The memory controller 5 controls access to the nonvolatile memory 2 by using flag information that is stored in the flag information storage unit 3. To be specific, when the value of the flag information is a specified value and the validity of access is authenticated by the authentication controller 4, the memory controller 5 allows reading of secret information from the secret area 6.

In the semiconductor device 1, the memory controller 5 determines whether or not to allow reading in accordance not only with an authentication result by the authentication controller 4 but also with the value of flag information. Therefore, when the value of flag information is set to a value different from the above-described specified value, the memory controller 5 does not allow reading of secret information regardless of an authentication result by the authentication controller 4. Thus, in the semiconductor device 1, it is possible to improve the secrecy of information written in the secret area compared with the case of controlling access only by authentication.

First Embodiment

Figure 2:
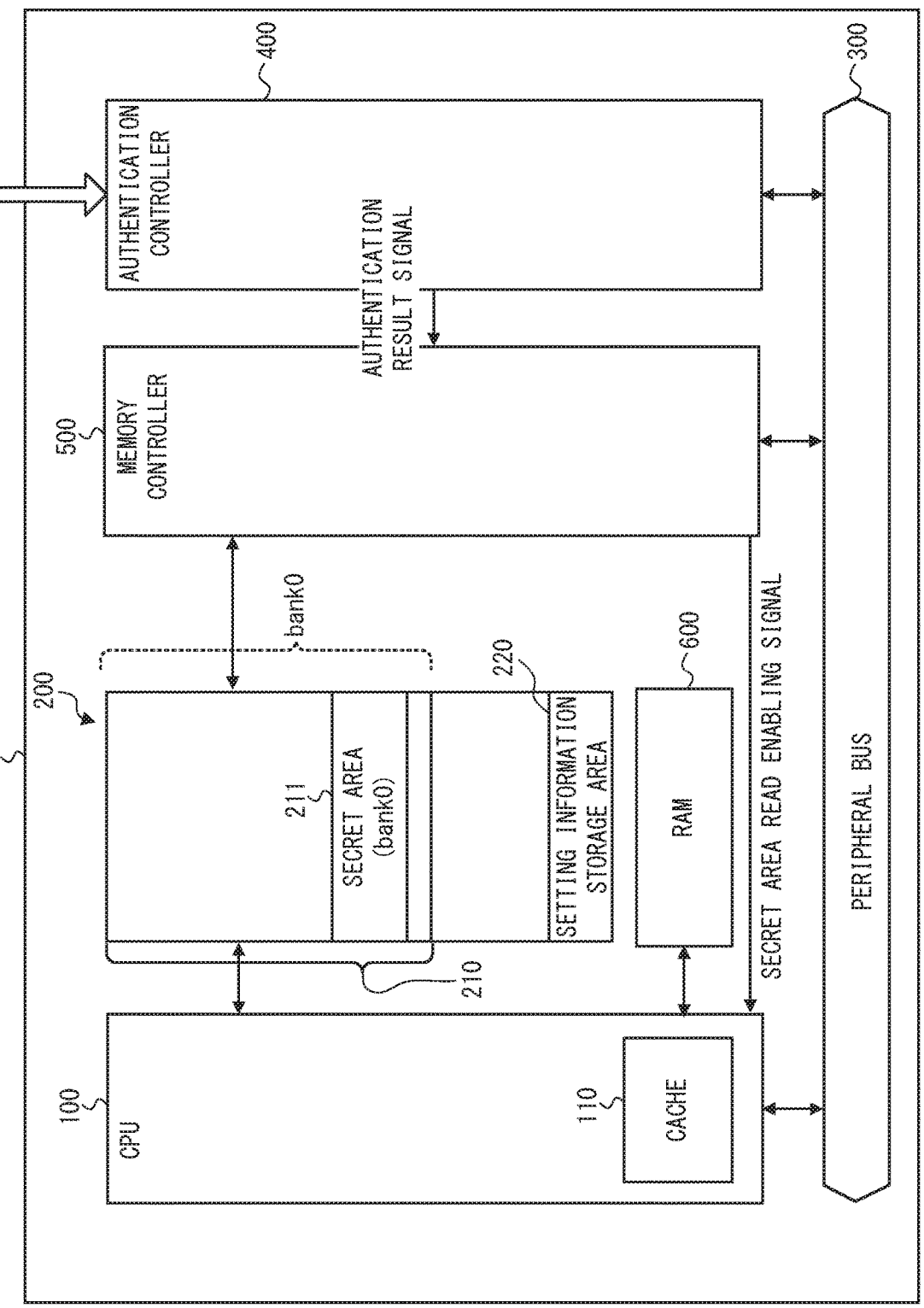
FIG. 2 is a schematic diagram showing the hardware configuration of the semiconductor device according to a first embodiment.

The details of the first embodiment are described hereinafter. FIG. 2 is a schematic diagram showing the hardware configuration of the semiconductor device 10 according to the first embodiment. The semiconductor device 10 is configured as a microcomputer. As shown in FIG. 2, in the semiconductor device 10, a CPU (Central Processing Unit) 100 that controls the operation of the semiconductor device 10, a nonvolatile memory 200 having a secret area 211 and a setting information storage area 220, an authentication controller 400 and a memory controller 500 exist on a peripheral bus 300. Further, in order to temporarily save a program or the like during the operation of the CPU 100, a RAM (Random Access Memory) 600 is connected to the CPU 100. Furthermore, the CPU 100 has a cache 110 in order for the CPU 100 to effectively obtain a program from the nonvolatile memory 200. In addition, although not shown, the CPU 100 has a reading control circuit that is used when the CPU 100 accesses to the nonvolatile memory 200.

The nonvolatile memory 200 stores various types of information such as programs to be executed by the CPU 100. Note that, among those programs, a program with secrecy is stored as secret information in the secret area 211. The secret area 211, like the secret area 6, is an area where secret information is stored. Although the nonvolatile memory 200 is a flash memory in this embodiment, it may be another type of nonvolatile memory.

The nonvolatile memory 200 has a program storage area 210, which is an area to store a program, and a setting information storage area 220. The program storage area 210 has a secret area 211 to store secret information. The setting information storage area 220 is an area to store security setting information for the secret area 211, and it includes a security data setting area 221 and an authentication information expected value setting area 222 as shown in FIG. 3.

Figures 3, 4, 5:
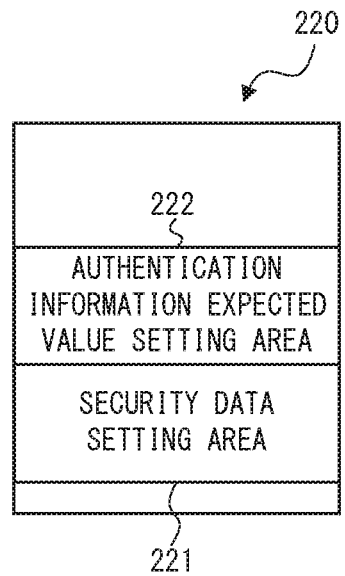
FIG. 3 is a schematic diagram showing an example of the structure of a setting information storage area according to the first embodiment.
FIG. 4 is a schematic diagram showing an example of the structure of a security data setting area according to the first embodiment.
FIG. 5 is a schematic diagram showing an example of the structure of an authentication information expected value setting area according to the first embodiment.

FIG. 4 is a schematic diagram showing an example of the structure of the security data setting area 221. As shown in FIG. 4, a setting value of a reading control flag and a setting value of a security protection flag are stored in the security data setting area 221. In this embodiment, the setting value of the reading control flag and the setting value of the security protection flag are stored in the same address of the security data setting area 221. In the example of FIG. 4, to be specific, the setting value of the security protection flag is stored in the least significant bit (bit0) of a specified address, and the setting value of the reading control flag is stored in the most significant bit (bit31) of the specified address. Note that the setting value of the reading control flag and the setting value of the security protection flag may be stored in different addresses of the security data setting area 221.

The security protection flag is flag information for inhibiting both of writing to the secret area 211 and reading from the secret area 211. When the setting value of the security protection flag is 0, both of writing to the secret area 211 and reading from the secret area 211 are inhibited by the memory controller 500. On the other hand, when the setting value of the security protection flag is 1, writing to the secret area 211 is allowed by the memory controller 500. In this manner, in this embodiment, the security protection flag is, in other words, the flag information for controlling whether or not to allow writing to the secret area 211. Further, when the security protection flag is 1, whether or not to allow reading from the secret area 211 is determined by the memory controller 500 in a comprehensive manner in combination with other conditions.

In this embodiment, the reading control flag is the flag information for inhibiting reading of secret information in the secret area 211 regardless of an authentication result by the authentication controller 400. When the setting value of the reading control flag is 1, reading of secret information in the secret area 211 is inhibited regardless of an authentication result by the authentication controller 400. On the other hand, when the setting value of the reading control flag is 0, whether or not to allow reading of secret information in the secret area 211 is determined in accordance with an authentication result by the authentication controller 400. Note that, as described above, it is necessary that the value of the security protection flag is set to 1 in this case. The details of conditions where reading from the secret area 211 is allowed in this embodiment are described later.

As described above, in this embodiment, the nonvolatile memory 200 functions also as the above-described flag information storage unit 3. Specifically, the nonvolatile memory 200 stores the security protection flag and the reading control flag as the flag information to be used for determining whether or not to allow access to the nonvolatile memory 200.

FIG. 5 is a schematic diagram showing an example of the structure of the authentication information expected value setting area 222. As shown in FIG. 5, an authentication expected value is stored in the authentication information expected value setting area 222. The authentication expected value is a value that is referred to when the authentication controller 400 performs authentication. In the example of FIG. 5, a 32-bit authentication expected value is stored.

Figure 6:
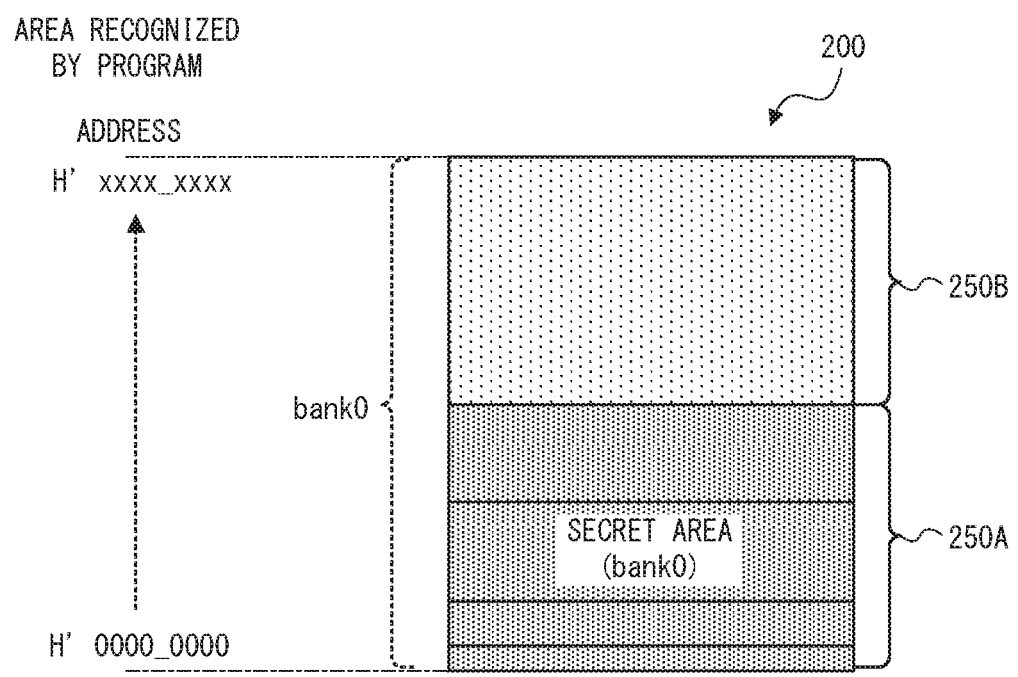
FIG. 6 is a schematic diagram showing an example of the bank structure of a nonvolatile memory according to the first embodiment.

FIG. 6 is a schematic diagram showing an example of the bank structure of the nonvolatile memory 200 according to this embodiment. In this embodiment, the nonvolatile memory 200 is composed of one bank, and it has only bank0 as a memory bank. Although bank0 is physically implemented by a flash memory macro 250A and a flash memory macro 250B in the example of FIG. 6, it may be implemented by one flash memory macro. Note that the memory macro is a unit (hard macro) that includes a reading circuit and a writing circuit of a memory.

The authentication controller 400 is described hereinafter. The authentication controller 400 corresponds to the authentication controller 4, and it is a control circuit that authenticates access to the nonvolatile memory 200. To be specific, the authentication controller 400 uses authentication information input from the outside and an expected value of authentication information prestored in the setting information storage area 220 and determines whether the input authentication information satisfies a predetermined condition. When the input authentication information satisfies a predetermined condition, the authentication controller 400 authenticates the validity of access.

In this embodiment, the authentication controller 400 compares a value obtained by converting the authentication information input from the outside according to a specified encryption algorithm with the authentication expected value stored in the authentication information expected value setting area 222, and determines whether those values match. When those values match, authentication is successful. On the other hand, when those values do not match, authentication is failed. The authentication information that is input from the outside is a password, an ID code and the like, for example, although not limited thereto.

The authentication controller 400 outputs an authentication result signal indicating an authentication result to the memory controller 500. To be specific, when authentication is successful, the authentication controller 400 outputs 1 as the authentication result signal, and when authentication is failed, the authentication controller 400 outputs 0 as the authentication result signal. Note that the authentication controller 400 is not limited to be implemented as hardware, and it may be implemented by executing a program, for example.

Figure 7:
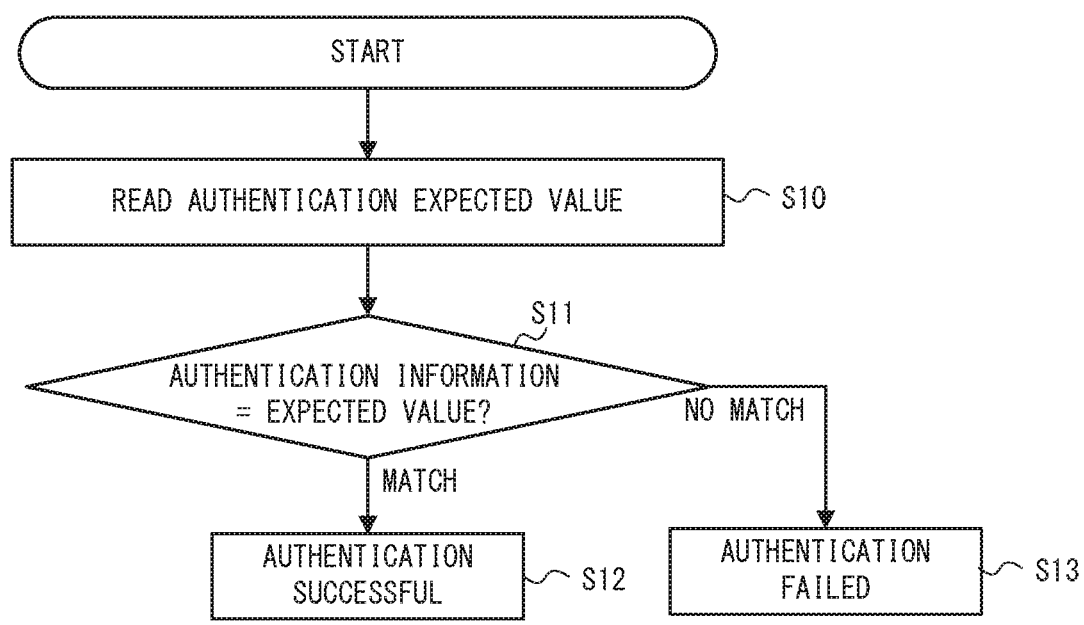
FIG. 7 is a flowchart showing an example of the operation of an authentication process by an authentication controller according to the first embodiment.

FIG. 7 is a flowchart showing an example of the operation of an authentication process by the authentication controller 400.

In Step 10 (S10), the authentication controller 400 reads the authentication expected value that is stored in the authentication information expected value setting area 222.

In Step 11 (S11), the authentication controller 400 determines whether the authentication information input to the authentication controller 400 and the authentication expected value read in Step 10 match or not.

When the authentication information and the authentication expected value match, the authentication controller 400 authenticates the validity of access in Step 12 (S12). Thus, authentication is successful, and the authentication controller 400 outputs 1 as the authentication result signal to the memory controller 500.

When the authentication information and the authentication expected value do not match, the authentication controller 400 does not authenticate the validity of access in Step 13 (S13). Thus, authentication is failed, and the authentication controller 400 outputs 0 as the authentication result signal to the memory controller 500.

Note that the authentication controller 400 may update the authentication expected value. For example, when authentication using the current authentication expected value is successful for the input authentication information, the authentication controller 400 stores a new authentication expected value, instead of the current authentication expected value, into the authentication information expected value setting area 222. Further, for example, when the value that is stored in the authentication information expected value setting area 222 is a value indicating the erased state of the nonvolatile memory 200 (for example, when the values of all bits of the authentication information expected value setting area 222 are 1), the authentication controller 400 stores the initial authentication expected value into the authentication information expected value setting area 222.

Figure 8:
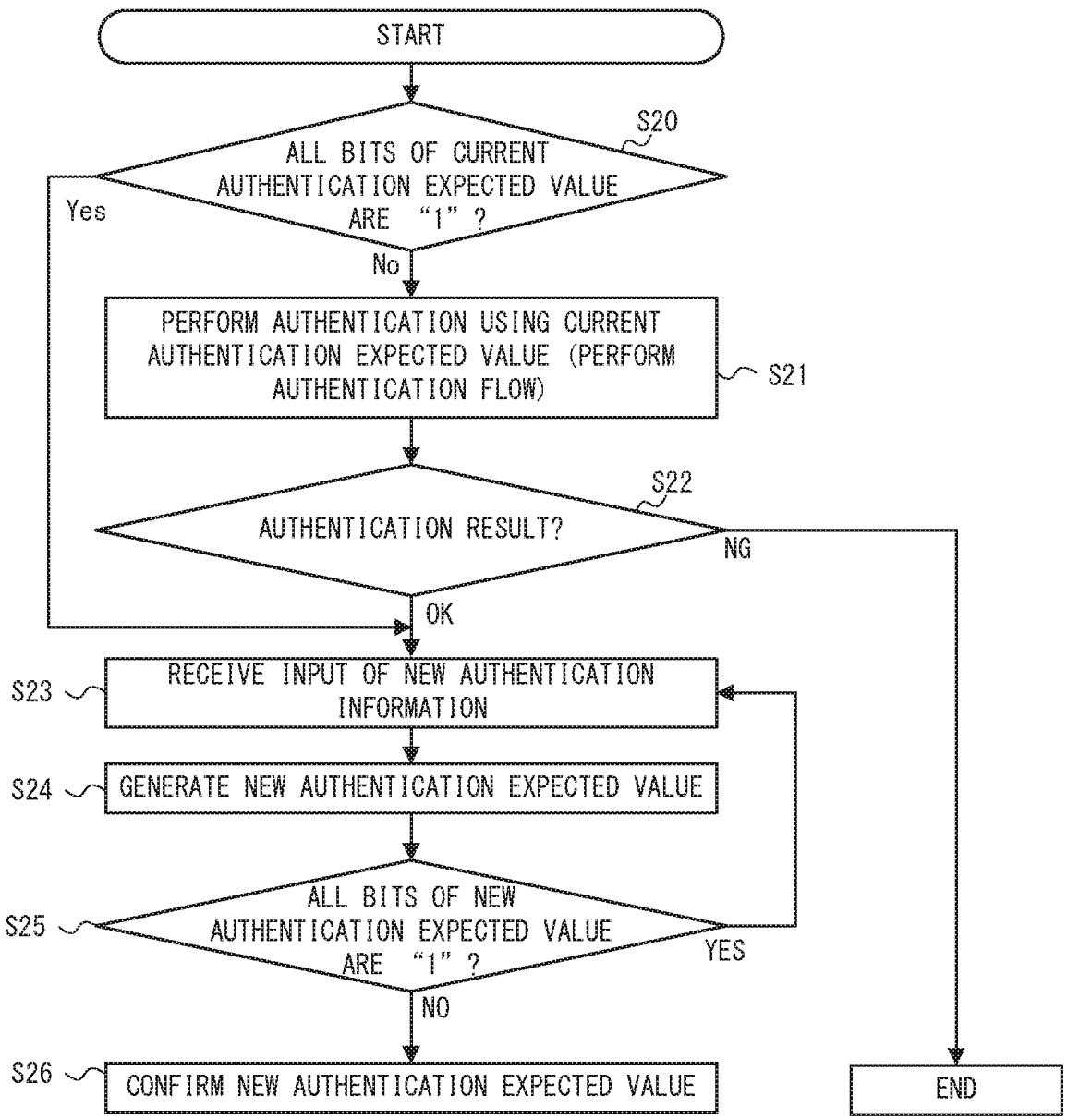
FIG. 8 is a flowchart showing an example of the operation to set an authentication expected value by an authentication controller according to the first embodiment.

FIG. 8 is a flowchart showing an example of the operation to set the authentication expected value by the authentication controller 400.

In Step 20 (S20), the authentication controller 400 checks whether the value stored in the authentication information expected value setting area 222 is a value indicating the erased state of the nonvolatile memory 200 or not. To be specific, the authentication controller 400 determines whether the values of all bits of the current authentication expected value are 1 or not. When the value stored in the authentication information expected value setting area 222 is a value indicating the erased state of the nonvolatile memory 200, which is, when the values of all bits of the current authentication expected value are 1, the process proceeds to Step 23. On the other hand, when the value stored in the authentication information expected value setting area 222 is not a value indicating the erased state of the nonvolatile memory 200, which is, when the value of at least one bit of the bit sequence of the current authentication expected value is 0, the process proceeds to Step 21.

In Step 21 (S21), the authentication controller 400 performs an authentication process with use of the current authentication expected value. Specifically, the authentication controller 400 performs the process shown in the flowchart of FIG. 7. When authentication is successful (OK in Step 22 (S22)), the process proceeds to Step 23. On the other hand, when authentication is failed (NG in Step 22 (S22)), the process ends. The authentication controller 400 ends the authentication expected value setting operation.

In Step 23 (S23), the authentication controller 400 receives the input of new authentication information.

In Step 24 (S24), the authentication controller 400 generates a new authentication expected value based on the new authentication information received in Step 23. For example, the authentication controller 400 converts the new authentication information received in Step 23 into an authentication expected value according to a specified encryption algorithm.

In Step 25 (S25), the authentication controller 400 checks whether the new authentication expected value generated in Step 24 is a value indicating the erased state of the nonvolatile memory 200 or not. To be specific, the authentication controller 400 determines whether the values of all bits of the new authentication expected value generated in Step 24 are 1 or not. When the new authentication expected value is a value indicating the erased state of the nonvolatile memory 200, which is, when the values of all bits of the new authentication expected value are 1, the input new authentication expected value is not appropriate, and the process returns to Step 22. On the other hand, when the new authentication expected value is not a value indicating the erased state of the nonvolatile memory 200, which is, when the value of at least one bit of the bit sequence of the new authentication expected value is 0, the process proceeds to Step 26.

In Step 26 (S26), the authentication controller 400 finally determines that the new authentication expected value generated in Step 24 as an authentication expected value to be newly stored in the authentication information expected value setting area 222. Thus, the authentication controller 400 stores the new authentication expected value generated in Step 24 into the authentication information expected value setting area 222.

The memory controller 500 is described hereinafter. The memory controller 500 corresponds to the memory controller 5, and it is a control circuit that controls access to the nonvolatile memory 200 by using flag information. In this embodiment, to be specific, the memory controller 500 controls access to the nonvolatile memory 200 by using the flag information that is stored in the security data setting area 221. Note that the memory controller 500 is not limited to be implemented as hardware, and it may be implemented by executing a program, for example.

Note that the program for implementing the authentication controller 400 and the program for implementing the memory controller 500 can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Determination by the memory controller 500 as to whether or not to allow access according to the first embodiment is described hereinbelow. FIG. 9 is a table showing conditions for determination as to whether or not to allow access which is made by the memory controller 500 according to this embodiment. As shown in FIG. 9, the memory controller 500 determines whether or not to allow access to the secret area 211 in the following way.

When the value of the security protection flag is 0, the memory controller 500 inhibits writing of information to the secret area 211 and inhibits reading of secret information from the secret area 211. Thus, when the value of the security protection flag is 0, writing to the secret area 211 and reading from the secret area 211 are always inhibited regardless of the setting value of the reading control flag. Further, when the value of the security protection flag is 0, writing to the secret area 211 and reading from the secret area 211 are always inhibited regardless of a result of authentication by the authentication controller 400.

When the value of the security protection flag is 1, the memory controller 500 allows writing of information to the secret area 211. Thus, when the value of the security protection flag is 1, writing to the secret area 211 is always allowed regardless of the value of the reading control flag. Further, when the value of the security protection flag is 1, writing to the secret area 211 is always allowed regardless of a result of authentication by the authentication controller 400. In this manner, when the value of the security protection flag is a value indicating to allow writing to the secret area 211, the memory controller 500 allows writing to the secret area 211.

When the value of the security protection flag is 1 and the value of the reading control flag is 1, the memory controller 500 inhibits reading of secret information in the secret area 211 regardless of an authentication result by the authentication controller 400. In this case, even when authentication for unauthorized access is successful, it is possible to prevent the secret information from being read. In this manner, the reading control flag limits the period when reading is enabled.

When the value of the security protection flag is 1 and the value of the reading control flag is 0, the memory controller 500 determines whether or not to allow reading of secret information from the secret area 211 depending on a result of authentication by the authentication controller 400. Thus, in this case, when authentication is successful, which is, when 1 is received as the authentication result signal from the authentication controller 400, the memory controller 500 allows reading of secret information from the secret area 211. On the other hand, when authentication is failed, which is, when 0 is received as the authentication result signal from the authentication controller 400, the memory controller 500 inhibits reading of secret information from the secret area 211. In this case, when the value of the reading control flag is not a value that indicates to inhibit reading of secret information regardless of an authentication result and the validity of access is authenticated by the authentication controller 400, the memory controller 500 allows reading of secret information from the secret area 211.

Figure 10:
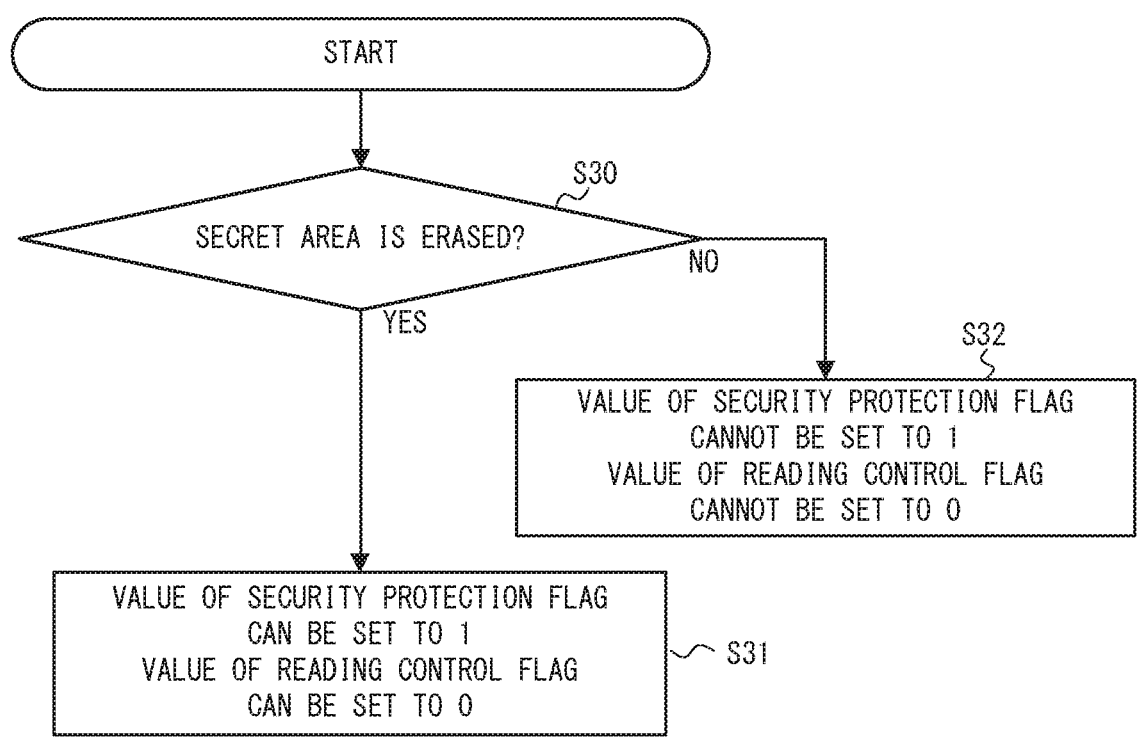
FIG. 10 is a flowchart showing a flow to determine whether to change the setting of flag information according to the first embodiment.

In this embodiment, when the contents of the secret area 211 are erased, the memory controller 500 changes the value of flag information to a value required to allow reading of secret information from the secret area 211. FIG. 10 is a flowchart showing a flow to determine whether to change the setting of flag information.

In Step 30 (S30), the memory controller 500 determines whether data stored in the secret area 211 is erased or not. When the memory controller 500 detects erasure in the secret area 211, the process proceeds to Step 31. On the other hand, when the memory controller 500 does not detect erasure in the secret area 211, the process proceeds to Step 32.

In Step 31 (S31), the memory controller 500 determines that the value of the security protection flag can be set to 1, and determines that the value of the reading control flag can be set to 0.

On the other hand, in Step 32 (S32), the memory controller 500 determines that the value of the security protection flag cannot be set to 1, and determines that the value of the reading control flag cannot be set to 0.

Note that the change of the setting of flag information can be made by rewriting the bits of the security data setting area 221. A specific method of disabling the switching of flag information may be arbitrary. For example, in response to a write request to the security data setting area 221, the memory controller 500 may output a write error. Alternatively, the switching of flag information may be disabled by not actually updating data even though a write operation is executed.

Figure 11:
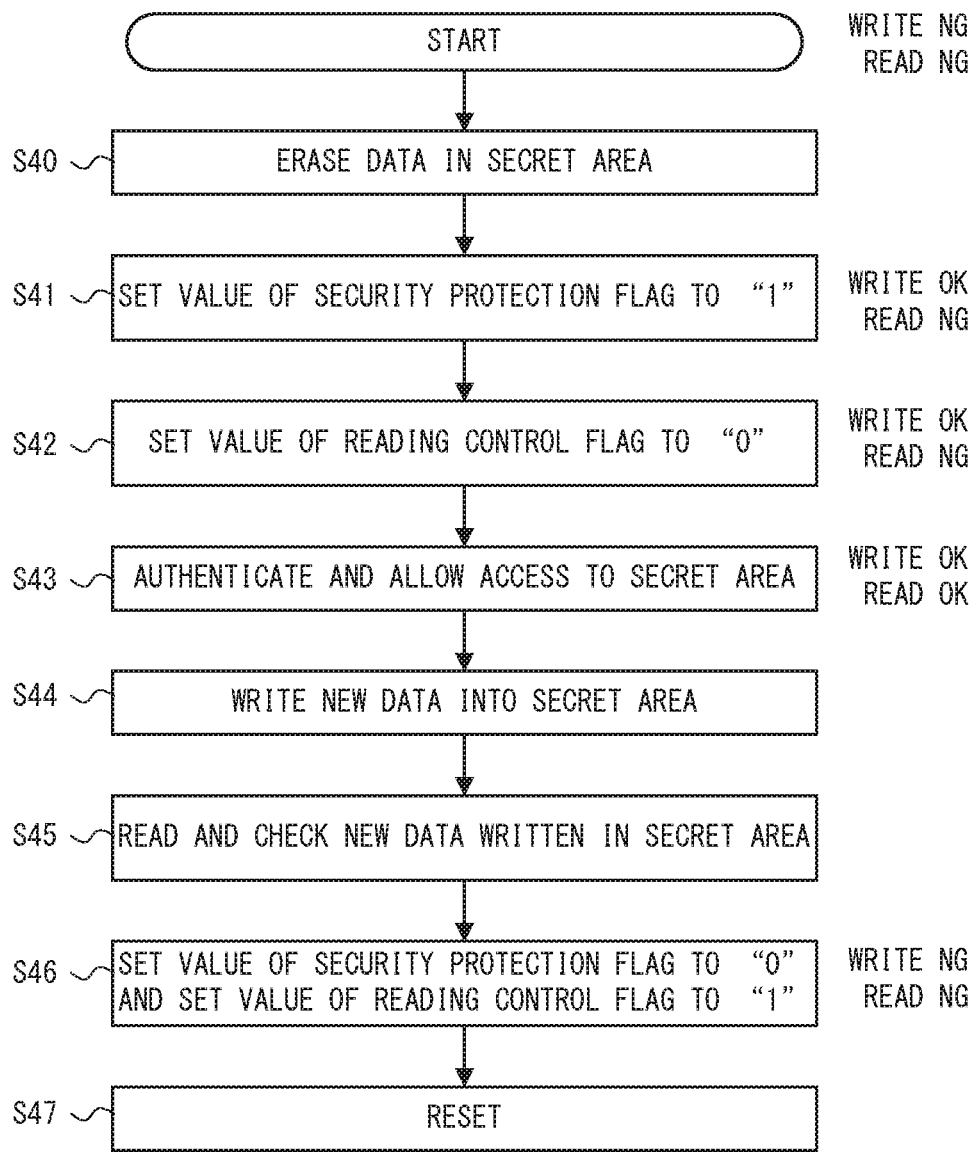
FIG. 11 is a flowchart showing an example of the operation to update data in a secret area according to the first embodiment.

The operation to update data in the secret area 211 in the semiconductor device 10 is described hereinafter. FIG. 11 is a flowchart showing an example of the operation to update data in the secret area 211. Note that, in FIG. 11, next to a step in the flowchart, whether access to the secret area 211 is enabled or not when that step is performed is shown. Hereinafter, the operation to update data in the secret area 211 is described with reference to FIG. 11. Note that, because the nonvolatile memory 200 is composed of one bank as described above in this embodiment, it is not possible to execute a ROM program that is stored in the nonvolatile memory 200 during execution of rewrite. Thus, the ROM program that is executed at the time of update is copied to another memory such as the RAM 600 before update. Then, at the time of update of the secret area 211, this ROM program is executed on the memory to which the program has been copied.

Note that the setting value of flag information before the update operation is performed is as follows. Specifically, the value of the security protection flag is 0, and the value of the reading control flag is 1. Therefore, in this state, writing to the secret area 211 and reading from the secret area 211 are inhibited.

In Step 40 (S40), data of the secret area 211 is erased. To be specific, data of the secret area 211 is erased based on an instruction from a valid user to update the secret area 211 or by execution of an erase program prepared by this user, for example. The memory controller 500 thereby detects erasure in the secret area 211, and determines that the value of the security protection flag can be set to 1, and determines that the value of the reading control flag can be set to 0.

Note that the data erased in Step 40 is a program that is developed by a valid user to update the secret area 211. Thus, in this embodiment, in the case where a valid user updates an old program that has been stored into the secret area 211 by this user, the old program stored in the secret area 211 is deleted once. However, by performing such a delete step, it is possible to reliably prevent the old program stored in the secret area 211 from being viewed by an invalid user.

In Step 41 (S41) and Step 42 (S42), the setting value of flag information is changed. In this embodiment, because the reading control flag and the security protection flag are stored in the same address of the security data setting area 221 as described above, the memory controller 500 can perform Step 41 and Step 42 at the same time. Note that, however, Step 41 and Step 42 are not necessarily performed at the same time. In Step 41, the memory controller 500 sets the value of the security protection flag to 1. The state thereby changes from the state where writing to the secret area 211 is inhibited to the state where it is allowed. In other words, the memory controller 500 allows a request for writing to the secret area 211. In Step 42, the memory controller 500 sets the value of the reading control flag to 0. Note that, even after the value of the reading control flag is changed to 0, the state where reading from the secret area 211 is inhibited continues.

In Step 43 (S43), authentication by the authentication controller 400 is performed. When an authentication result to allow access is obtained, which is, when the memory controller 500 receives the authentication result signal indicating success in authentication from the authentication controller 400, the memory controller 500 allows a read request to the secret area 211. To be specific, the memory controller 500 outputs a read enabling signal for the secret area 211 to the CPU 100. Note that, although the case where an authentication result to allow access is obtained, which is, the case where authentication is successful, is shown as an example in the flowchart of FIG. 11, in the case where authentication is failed, the state where reading is inhibited continues.

In Step 44 (S44), new data is written into the secret area 211. To be specific, secret information (new program) is written into the secret area 211 based on an instruction from a valid user to update the secret area 211 or by execution of a write program prepared by this user, for example.

In Step 45 (S45), the new data that has been written into the secret area 211 is read, and the written contents are checked. This is to check whether writing is properly done in the writing of Step 44. To be specific, data of the secret area 211 is read based on an instruction from a valid user to update the secret area 211 or by execution of a check program prepared by this user, for example.

In Step 46 (S46), the memory controller 500 receives a notification indicating completion of checking in Step 45 and changes flag information. Note that this notification may be made to the memory controller 500 based on an instruction from a valid user to update the secret area 211, or a check program prepared by this user may make this notification to the memory controller 500. In this step, the memory controller 500 sets the value of the security protection flag to 0 and sets the value of the reading control flag to 1. The memory controller 500 thereby inhibits wiring and reading in the secret area 211 after that. Note that, in Step 46, the change of the security protection flag and the change of the reading control flag are not necessarily made at the same time. In other words, the changes of those flags may be made separately.

In Step 47 (S47), the system is reset (restarted). The authentication result signal is thereby initialized, and the signal state of the authentication result signal becomes a signal state indicating failure of authentication.

Although Step 42 and Step 43 are performed before Step 44 in the flowchart shown in FIG. 11, those steps may be performed after before Step 44 as a matter of course.

Note that, although the case where the reading control circuit is placed in the CPU 100 is assumed in the above description, the reading control circuit may be placed in the memory controller 500. Likewise, the cache 110 may be placed in the memory controller 500. Further, although the system is reset in Step 47, the reset is not necessarily made. In the case where the system is not reset, the signal state of the authentication result signal may be changed to a signal state indicating failure of authentication by intentionally inputting false authentication information to the authentication controller 400.

Note that it is possible to prevent secret information from remaining in the cache 110 after update by disabling the cache so that cache processing is not performed during update of the secret area 211. Further, in the case of performing cache processing during update of the secret area 211, it is possible to prevent secret information from remaining in the cache 110 after update by deleting data in the cache 110 by a notification from the memory controller 500, for example, after completion of update.

The first embodiment is described above. In the semiconductor device 10 according to the first embodiment, whether or not to allow reading of secret information is determined not only by an authentication result but by the value of the reading control flag for inhibiting reading regardless of an authentication result. It is therefore possible to improve the secrecy of information written in the secret area compared with the case of controlling access only by authentication. Further, as described above, the semiconductor device 10 has the security protection flag for controlling whether or not to allow writing to the secret area 211. It is therefore possible to ensure the security for writing to the secret area 211. Furthermore, in the semiconductor device 10 according to the first embodiment, the value of flag information cannot be changed to a value required to enable access unless the contents of the secret area 211 are erased. The secrecy of the secret area 211 is thereby further enhanced. Further, according to this embodiment, it is possible to ensure the secrecy of information written in the secret area even when the nonvolatile memory does not have a plurality of banks. Note that, although the secret area 211 needs to be erased before setting the value of the reading control flag to 0 in this embodiment, the value of the reading control flag may be set to 0 regardless of whether the secret area 211 is erased or not.

Modified Example of First Embodiment

A modified example of the first embodiment is described hereinafter. Note that differences of the modified example of the first embodiment from the above-described first embodiment are described, and the description of the same structures or operations is omitted as appropriate. Although the above-described semiconductor device 10 has the structure based on the assumption of the use environment where secret information is handled, the semiconductor device 10 according to the modified example has the structure in consideration of the convenience in the use environment where secret information is not handled. In the case where secret information is not handled in the nonvolatile memory 200, it is required that reading and writing in the nonvolatile memory 200 can be freely done. Therefore, in the case of such an application, the value of the security protection flag needs to be set to 1. However, as shown in FIG. 9, in the above-described semiconductor device 10, authentication by the authentication controller 400 is required for reading in the secret area 211 of the nonvolatile memory 200. It is thus not possible to implement free reading and writing in the nonvolatile memory 200.

In view of the above, in this modified example, the memory controller 500 determines whether or not to allow access to the secret area 211 as shown in FIG. 12. The table shown in FIG. 12 is different from the table shown in FIG. 9 in control of reading when the value of the security protection flag is 1 and the value of the reading control flag is 1. Specifically, when the value of the security protection flag is 1 and the value of the reading control flag is 1, the memory controller 500 according to the modified example allows reading of information from the secret area 211. Thus, in this case, authentication by the authentication controller 400 is not needed in the reading process. Thus, in the semiconductor device 10 according to the modified example, it is possible to read and write freely in the nonvolatile memory 200 by setting the value of the security protection flag to 1 and also setting the value of the reading control flag to 1.

In this modified example, in the application of the semiconductor device 10 that does not use secret information, the value of the reading control flag needs to be 1 in order to enable free reading from the secret area 211. This is because, as shown in FIG. 12, when the value of the security protection flag is 1, an authorization result is not required to determine whether or not to allow reading if the value of the reading control flag is 1. On the other hand, in the case of the application of the semiconductor device 10 that uses secret information in this modified example, the value of the reading control flag needs to be 0 in order to disable free reading from the secret area 211 in the reading process. This is because, as shown in FIG. 12, when the value of the security protection flag is 1, an authorization result is referred to in determination as to whether or not to allow reading if the value of the reading control flag is 0. Thus, in the semiconductor device 10 according to this modified example, the reading control flag is flag information for using an authentication result by the authentication controller 400 to determine whether or not to allow access. When the value of the reading control flag is 0, an authentication result by the authentication controller 400 is used to determine whether or not to allow access for reading from the secret area 211. On the other hand, when the setting value of the reading control flag is 1, an authentication result by the authentication controller 400 is not used to determine whether or not to allow access for reading from the secret area 211.

Further, as shown in the control conditions of the memory controller 500 shown in FIG. 12, in the semiconductor device 10 according to this modified example, the security protection flag is flag information for disabling writing to the secret area 211 and reading from the secret area 211.

In this modified example also, when the value of the security protection flag is 1, the value of the reading control flag is 0, and the validity of access is authorized by the authentication controller 400, the memory controller 500 allows reading of secret information from the secret area 211. Stated differently, in this modified example, when the value of the security protection flag is not a value that indicates to inhibit writing to the secret area 211 and reading from the secret area 211, the value of the reading control flag is a value that indicates to use an authentication result by the authentication controller 400 for determination as to whether or not allow access, and the validity of access is authenticated by the authentication controller 400, the memory controller 500 allows reading of secret information from the secret area 211.

Therefore, in the application of the semiconductor device 10 that uses secret information, whether or not to allow reading of secret information is determined not only by an authentication result but by the values of the security protection flag and the reading control flag. Thus, in this modified example also, it is possible to improve the secrecy of information written in the secret area compared with the case of controlling access only by authentication.

Note that the semiconductor device 10 according to this modified example also operates according to the flowcharts shown in the description of the semiconductor device 10 according to the first embodiment. However, although the change of the security protection flag and the change of the reading control flag are not necessarily made at the same time in Step 46 of FIG. 11 in the first embodiment, the changes of those flags are made at the same time in this modified example. Further, in the semiconductor device 10 according to this modified example, like in the first embodiment, the erasure of data in the secret area 211 is a condition for setting the value of the security protection flag to 1. As shown in FIG. 12, when the value of the security protection flag is changed to 1, free reading in the secret area 211 is enabled if the value of the reading control flag is 1. However, by erasing data of the secret area 211 in advance, it is possible to prevent secret information from improperly read in the application of the semiconductor device 10 that uses secret information.

Further, in this modified example, in the case where the value of the reading control flag is set to 1 in the application of the semiconductor device 10 that uses secret information, the value of the security protection flag is set to 0 at the same time. This is because, when the value of the reading control flag is set to 1 while the value of the security protection flag remains 1, reading of data in the secret area 211 is enabled as shown in FIG. 12 in the application of the semiconductor device 10 that uses secret information. As described above, in the semiconductor device 10, the reading control flag and the security protection flag are stored in the same address in the security data setting area 221. It is thus possible to rewrite those flags at the same time.

Figure 13:
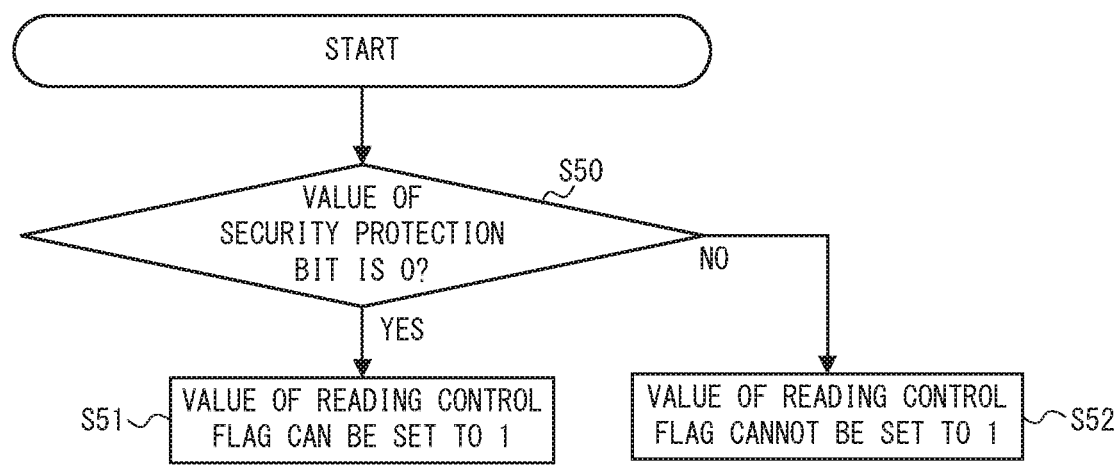
FIG. 13 is a flowchart showing a flow to determine whether to change the setting of a reading control flag according to a modified example of the first embodiment.

The above-described determination flow is described with reference to the flowchart. FIG. 13 is a flowchart showing a flow to determine whether to change the setting of the reading control flag.

In Step 50 (S50), the memory controller 500 determines whether the value of the security protection flag is 0 or not. When the value of the security protection flag is 0, the process proceeds to Step 51. When, on the other hand, the value of the security protection flag is 1, the process proceeds to Step 52.

In Step 51 (S51), the memory controller 500 determines that the value of the reading control flag can be set to 1.

On the other hand, in Step 52 (S52), the memory controller 500 determines that the value of the reading control flag cannot be set to 1.

The semiconductor device 10 according to the modified example of the first embodiment is described above. In this modified example, whether or not to allow reading of secret information is determined not only by an authentication result but by the values of the security protection flag and the reading control flag, and it is thereby possible to improve the secrecy of secret information compared with the case of controlling access only by authentication. Further, in the semiconductor device 10 according to the modified example of the first embodiment also, the value of flag information cannot be changed to a value required to enable access to secret information unless the contents of the secret area 211 are erased. The secrecy of the secret area 211 is thereby further enhanced. Further, in the semiconductor device 10 according to the modified example of the first embodiment, it is possible to read and write freely in the nonvolatile memory 200 in the application that does not use secret information Second Embodiment The second embodiment is described hereinafter. The nonvolatile memory 200 of the semiconductor device 10 according to the first embodiment is composed of one bank. On the other hand, a nonvolatile memory of a semiconductor device according to the second embodiment is different in that it is composed of two banks. Further, the nonvolatile memory of the semiconductor device according to the second embodiment is different from the nonvolatile memory 200 according to the first embodiment in that a bank information setting area, which is described later, is added to the setting information storage area 220.

In the case where the nonvolatile memory is in 2-bank structure, there is an advantage that it is not necessary to copy a ROM program to another memory such as the RAM 600 before update. Further, in the case where the nonvolatile memory is in 1-bank structure, a ROM program can be destroyed by a factor such as instantaneous power interruption during an update process. This can cause the system to be unable to start. On the other hand, in the case where the nonvolatile memory is in 2-bank structure, an update program can be written into one of the two banks which serves as a reserved area. Therefore, there is an advantage that the system can start without being affected in the event of instantaneous power interruption or the like.

Note that, differences of the second embodiment from the above-described first embodiment are described hereinafter, and the description of the same structures or operations is omitted as appropriate.

Figure 14:
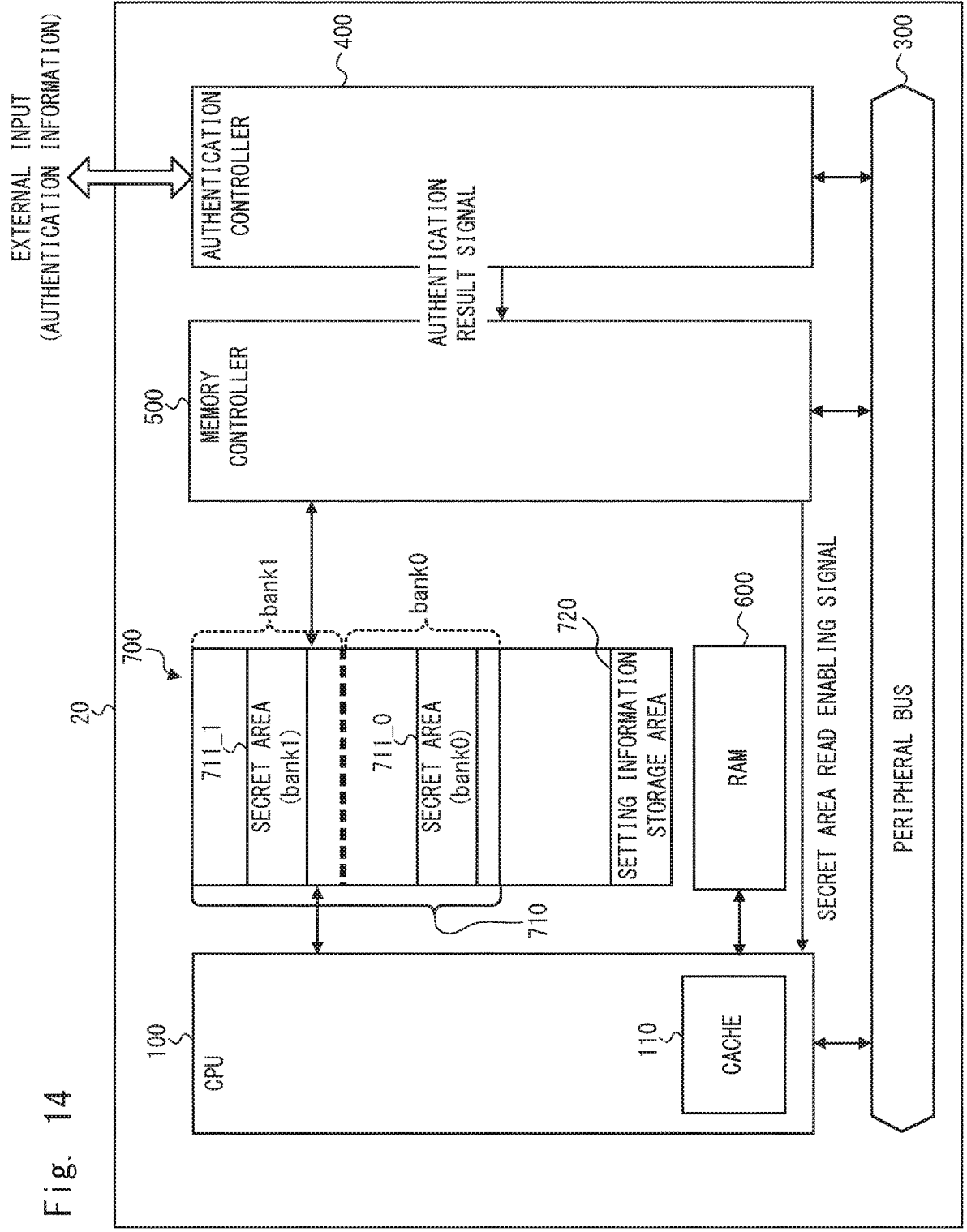
FIG. 14 is a schematic diagram showing the hardware configuration of a semiconductor device according to a second embodiment.

FIG. 14 is a schematic diagram showing the hardware configuration of a semiconductor device 20 according to the second embodiment. As shown in FIG. 14, in the semiconductor device 20, the nonvolatile memory 200 according to the first embodiment is replaced by a nonvolatile memory 700.

Figure 15:
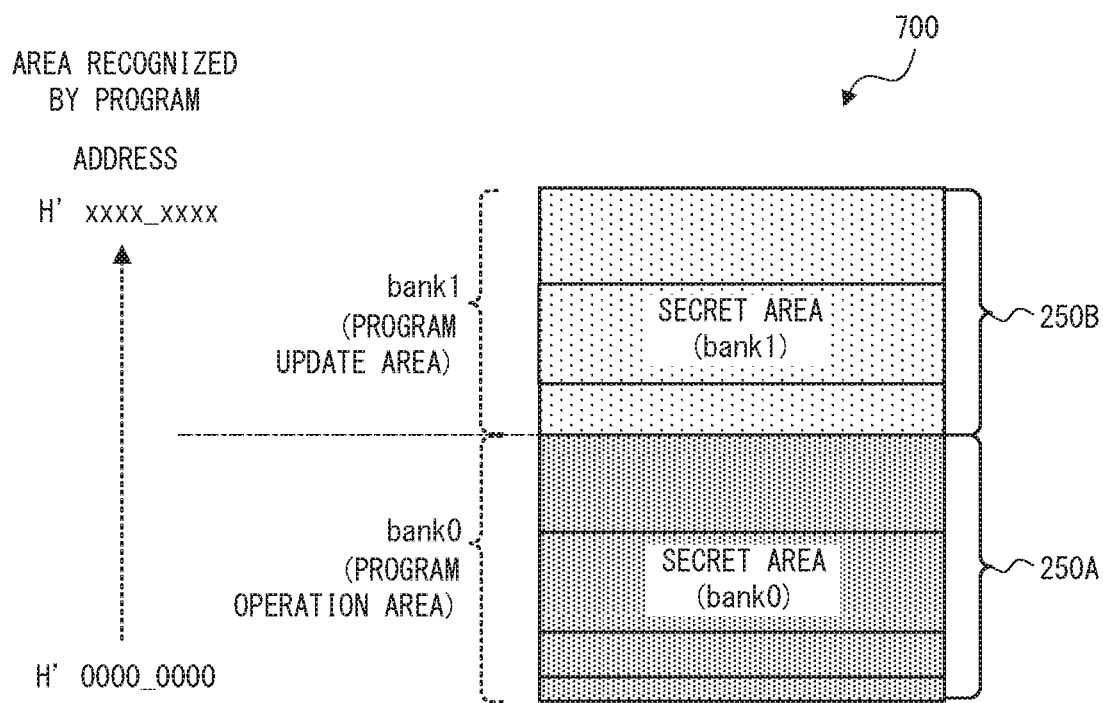
FIG. 15 is a schematic diagram showing an example of the bank structure of a nonvolatile memory according to the second embodiment.

FIG. 15 is a schematic diagram showing an example of the bank structure of the nonvolatile memory 700 according to this embodiment. In this embodiment, the nonvolatile memory 700 is composed of two banks, and it includes bank0 and bank1 as memory banks. One bank is physically implemented by a flash memory macro 250A, and the other banks is physically implemented by a flash memory macro 250B. In this embodiment, bank0 is an area where a boot program is to be stored, and bank1 is an area where an update program is to be stored. Thus, bank1 is a reserved area.

In this manner, because there are separate flash memory macros, the flash memory macro 250A and the flash memory macro 250B, that constitute the nonvolatile memory 700, it is possible to write a new program into bank1 at the time of update of a program. Therefore, even when the microcomputer is reset due to instantaneous power interruption or the like during the update process of bank1, the system can be restarted by the program stored in bank0.

Note that FIG. 15 shows the state where bank0 is physically implemented by the flash memory macro 250A, and bank1 is physically implemented by the flash memory macro 250B. However, after switching of the bank, which is described later, is done, it becomes the state where bank0 is physically implemented by the flash memory macro 250B, and bank1 is physically implemented by the flash memory macro 250A. In any state, the CPU 100 recognizes bank0 as an area where a boot program is stored and bank1 as a reserved area.

Further, in the semiconductor device 20 according to this embodiment, the nonvolatile memory 700 can change the structure from the above-described 2-bank structure to 1-bank structure as shown in FIG. 6. On the contrary, the nonvolatile memory 700 can change the structure from 1-bank structure to 2-bank structure.

The nonvolatile memory 700, like the nonvolatile memory 200, stores various types of information such as programs to be executed by the CPU 100. Although the nonvolatile memory 700 is a flash memory in this embodiment, it may be another type of nonvolatile memory.

As shown in FIG. 14, the nonvolatile memory 700 has a program storage area 710, which is an area to store a program, and a setting information storage area 720. The program storage area 710 is divided to an area that belongs to bank0 and an area that belongs to bank1, and both areas have a secret area. In other words, the program storage area 710 includes a secret area 711_0 that belongs to bank0 and a secret area 711_1 that belongs to bank1.

Figure 16:
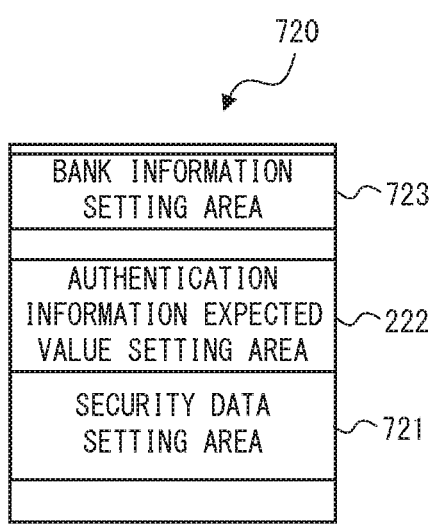
FIG. 16 is a schematic diagram showing an example of the structure of a setting information storage area according to the second embodiment.

As shown in FIG. 16, the setting information storage area 720 includes a security data setting area 721, an authentication information expected value setting area 222, and a bank information setting area 723. The security data setting area 721 is the same as the security data setting area 221 according to the first embodiment. As for the security protection flag, however, the security data setting area 721 stores a security protection flag for bank0 and a security protection flag for bank1 as shown in FIG. 17. To be specific, in this embodiment, the setting value of the reading control flag, the setting value of the security protection flag for bank0 and the setting value of the security protection flag for bank1 are stored in the same address of the security data setting area 721. Note that the setting values of those flags may be stored in different addresses of the security data setting area 721.

FIG. 18 is a schematic diagram showing an example of the structure of the bank information setting area 723. As shown in FIG. 18, the setting value of a bank structure setting flag and the setting value of an effective bank setting flag are stored in the bank information setting area 723.

The bank structure setting flag is a flag for switching the bank structure to be recognized by the CPU. Specifically, the bank structure setting flag is a flag for setting the bank structure of the nonvolatile memory 700 to 1-bank structure or 2-bank structure. When the setting value of the bank structure setting flag is 1, the bank structure of the nonvolatile memory 700 is set to 1-bank structure. When, on the other hand, the setting value of the bank structure setting flag is 0, the bank structure of the nonvolatile memory 700 is set to 2-bank structure.

The effective bank setting flag is a flag for setting which flash memory macro is to implement the area where a boot program is to be stored. Stated differently, it is a flag for specifying an effective bank among a plurality of banks. When the setting value of the effective bank setting flag is 1, the bank that is to be implemented by the flash memory macro 250A is the area where a boot program is to be stored.

Specifically, when the setting value of the effective bank setting flag is 1, bank0 is implemented by the flash memory macro 250A. Accordingly, when the setting value of the effective bank setting flag is 1, bank1 is implemented by the flash memory macro 250B. Further, when the setting value of the effective bank setting flag is 0, the bank that is to be implemented by the flash memory macro 250B is the area where a boot program is to be stored. Specifically, when the setting value of the effective bank setting flag is 0, bank0 is implemented by the flash memory macro 250B. Accordingly, when the setting value of the effective bank setting flag is 0, bank1 is implemented by the flash memory macro 250A. Note that, in the following description, such switching of the bank by a change in the effective bank setting flag is referred to as switching of the effective bank.

Note that, because the change of the bank structure is not frequently made, the bank structure setting flag is not changed frequently. On the other hand, the frequency of updating data in the secret area is higher than the frequency of changing the bank structure. Accordingly, the frequency of changing the effective bank setting flag is higher than the frequency of changing the bank structure setting flag. Therefore, as shown in FIG. 18, it is more secure that the bank structure setting flag is stored in a different address from the effective bank setting flag. If the bank structure setting flag and the effective bank setting flag are stored in the same address, incorrect setting, such as changing the bank structure setting flag instead of the effective bank setting flag by mistake, can occur. By storing those flags in different addresses, the occurrence of such incorrect setting can be prevented.

Determination by the memory controller 500 as to whether or not to allow access according to this embodiment is described hereinbelow. FIG. 19 is a table showing conditions for determination as to whether or not to allow access which is made by the memory controller 500 according to this embodiment. As shown in FIG. 19, the memory controller 500 determines whether or not to allow access to the secret areas 711_0 and 711_1 in the following way. Note that, in this embodiment, writing of an update program is made to bank1. Thus, in the application of the semiconductor device 20 that uses secret information, it is not necessary to set the value of the security protection flag for bank0 to 1. Therefore, when the value of the security protection flag for bank0 is once set to 0, for example, it is controlled so that the value cannot be changed to 1. In other words, the security protection flag for bank0 is configured so that setting cannot be cleared once it is made. Note that, however, it is not limited such configuration, and the security protection flag for bank0 can be configured so that the setting value can be changed to 1, just like the security protection flag for bank1. In this case, however, it is preferred that the setting value can be changed to 1 only after data in the secret area 711_0 is erased.

When the value of the security protection flag for bank0 is 1, the memory controller 500 according to this embodiment determines that it is the application of the semiconductor device 20 that does not use secret information, and it imposes no restrictions on access to the secret area 711_0 that belongs to bank0 and access to the secret area 711_1 that belongs to bank1. Specifically, in this case, the memory controller 500 allows writing and reading in the secret area 711_0 and writing and reading in the secret area 711_1 with no conditions. On the other hand, when the value of the security protection flag for bank0 is 0, the memory controller 500 according to this embodiment determines that it is the application of the semiconductor device 20 that uses secret information and makes determination about access as follows.

Determination by the memory controller 500 as to whether or not to allow access according to this embodiment is described in detail hereinafter with reference to FIG. 19. When the value of the security protection flag for bank0 is 0, the memory controller 500 inhibits writing of information to the secret area 711_0 that belongs to bank0 and inhibits reading of secret information from the secret area 711_0. Thus, in this embodiment, writing and reading in the secret area 711_0 cannot be made.

Control of writing and reading in the secret area 711_1 that belongs to bank1 is described hereinafter. Control of writing and reading in the secret area 711_1 that belongs to bank1 is the same as control in the first embodiment. To be specific, control is made in the following way.

When the value of the security protection flag for bank1 is 0, the memory controller 500 inhibits writing of information to the secret area 711_1 and inhibits reading of secret information from the secret area 711_1. Thus, when the value of the security protection flag for bank1 is 0, writing and reading in the secret area 711_1 cannot be made.

When the value of the security protection flag for bank1 is 1, the memory controller 500 allows writing of information to the secret area 711_1 that belongs to bank1. Thus, when the value of the security protection flag for bank1 is 1, writing to the secret area 711_1 is allowed regardless of the setting value of the reading control flag. Further, when the value of the security protection flag for bank1 is 1, writing to the secret area 711_1 is allowed regardless of a result of authentication by the authentication controller 400.

When the value of the security protection flag for bank1 is 1 and the value of the reading control flag is 1, the memory controller 500 inhibits reading of secret information in the secret area 711_1 regardless of a result of authentication by the authentication controller 400.

When the value of the security protection flag for bank1 is 1 and the value of the reading control flag is 0, the memory controller 500 determines whether or not to allow reading of secret information from the secret area 711_1 depending on a result of authentication by the authentication controller 400. Thus, in this case, when authentication is successful, which is, when 1 is received as the authentication result signal from the authentication controller 400, the memory controller 500 allows reading of secret information from the secret area 711_1. On the other hand, when authentication is failed, which is, when 0 is received as the authentication result signal from the authentication controller 400, the memory controller 500 inhibits reading of secret information from the secret area 711_1.

Figure 20:
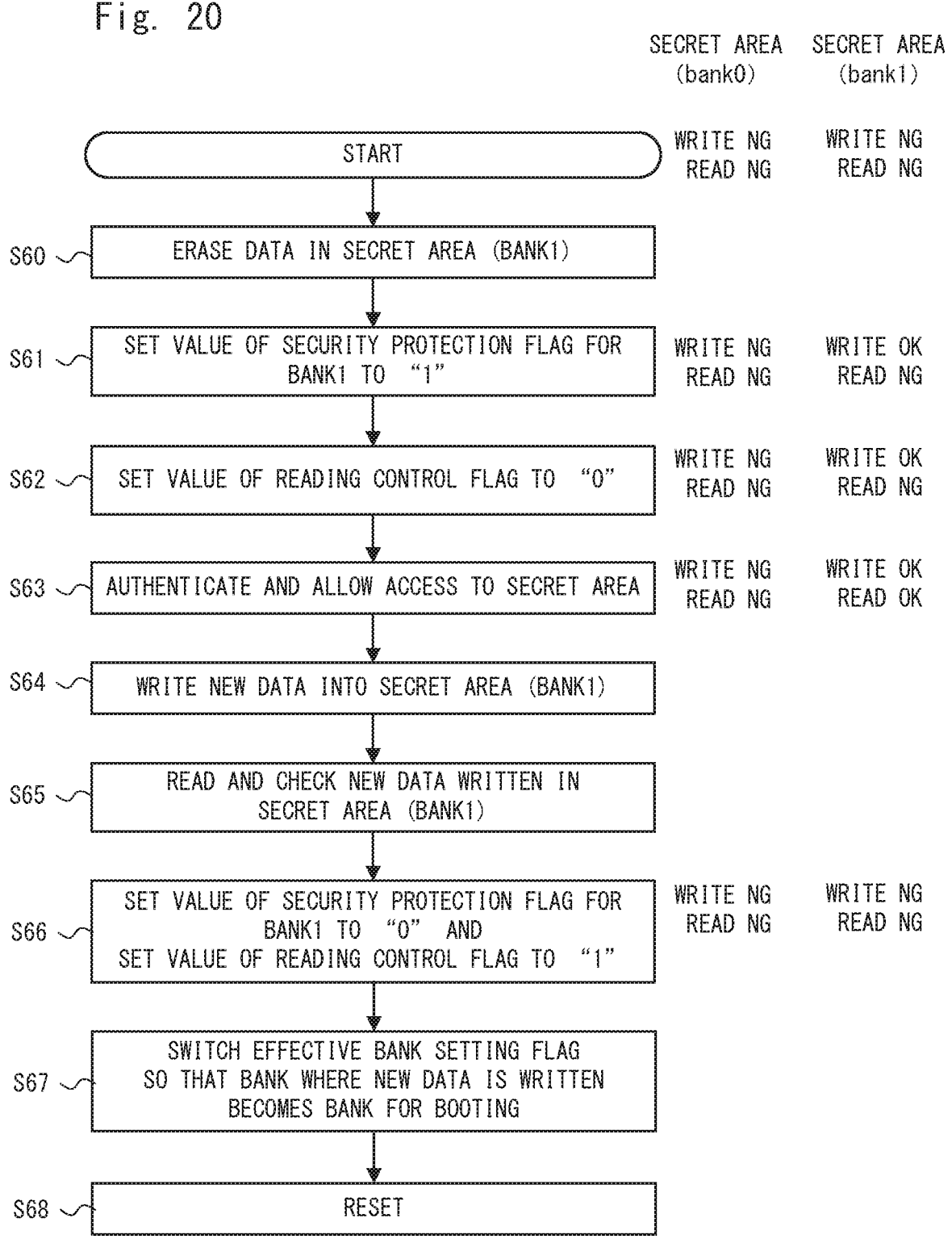
FIG. 20 is a flowchart showing an example of the operation to update data in a secret area according to the second embodiment.

The operation to update data in the secret area in the semiconductor device 20 is described hereinafter. In this embodiment, the secret area is updated by writing new secret information to the secret area 711_1 that belongs to bank1 and then switching the effective bank. FIG. 20 is a flowchart showing an example of the operation to update data in the secret area according to the second embodiment. Note that, in FIG. 20, next to a step in the flowchart, whether access to the secret areas 711_0 and the secret area 711_1 is enabled or not when that step is performed is shown. Hereinafter, the operation to update data in the secret area is described with reference to FIG. 20.

Note that the setting value of flag information before the update operation is performed is as follows. Specifically, the value of the security protection flag for bank0 and the value of the security protection flag for bank1 are 0, and the value of the reading control flag is 1. Therefore, in this state, writing to the secret area 711_1 and reading from the secret area 711_1 are inhibited. Note that, as described above, writing to and reading from the secret area 711_0 remain to be inhibited in the update operation.

In Step 60 (S60), like the above-described Step 40, data of the secret area 711_1 is erased. The memory controller 500 thereby detects erasure in the secret area 711_1, and determines that the value of the security protection flag can be set to 1, and determines that the value of the reading control flag can be set to 0. Note that, although the structure where the secret area 711_1 needs to be erased before setting the value of the reading control flag to 0 is described as an example, the value of the reading control flag may be set to 0 regardless of whether the secret area 711_1 is erased or not.

In Step 61 (S61) and Step 62 (S62), the setting value of flag information is changed just like in the above-described Steps 41 and 42. To be specific, in Step 61, the memory controller 500 sets the value of the security protection flag for bank1 to 1. The state thereby changes from the state where writing to the secret area 711_1 is inhibited to the state where it is allowed. In other words, the memory controller 500 allows a request for writing to the secret area 711_1. In Step 62, the memory controller 500 sets the value of the reading control flag to 0. Note that, even after the value of the reading control flag is changed to 0, the state where reading from the secret area 711_1 is inhibited continues.

In Step 63 (S63), authentication by the authentication controller 400 is performed, just like in the above-described Step 43. When authentication is successful, the memory controller 500 allows reading from the secret area 711_1. Note that, although the case where authentication is successful is shown as an example in the flowchart of FIG. 20, in the case where authentication is failed, the state where reading is inhibited continues.

In Step 64 (S64), new data is written into the secret area 711_1, just like in the above-described step 44.

In Step 65 (S65), the new data that has been written into the secret area 711_1 is read, and the written contents are checked, just like in the above-described step 45.

In Step 66 (S66), the memory controller 500 receives a notification indicating completion of checking in Step 65 and changes flag information, just like in the above-described step 46. To be specific, the memory controller 500 sets the value of the security protection flag for bank1 to 0 and sets the value of the reading control flag to 1. The memory controller 500 thereby inhibits wiring and reading in the secret area 711_1 after that.

In Step 67 (S67), the memory controller 500 switches the effective bank setting flag so that the bank where new data is written becomes the bank for booting. Specifically, the memory controller 500 switches the effective bank setting flag so that the bank where new data is written becomes the bank in the area where a boot program is to be stored. In this manner, when new secret information is written into the secret area of the bank that is not currently effective, the memory controller 500 switches the effective bank setting flag so as to set this bank to an effective bank.

At the start of the flow of the update operation shown in FIG. 20, when bank0 is implemented by the flash memory macro 250A, which is, when the value of effective bank setting flag is 1, the memory controller 500 switches the effective bank setting flag in Step 67 so that bank0 is implemented by the flash memory macro 250B. Specifically, in this case, the memory controller 500 changes the value of the effective bank setting flag from 1 to 0 in Step 67.

On the other hand, at the start of the flow of the update operation shown in FIG. 20, when bank0 is implemented by the flash memory macro 250B, which is, when the value of effective bank setting flag is 0, the memory controller 500 switches the effective bank setting flag in Step 67 so that bank0 is implemented by the flash memory macro 250A. Specifically, in this case, the memory controller 500 changes the value of the effective bank setting flag from 0 to 1 in Step 67.

In Step 68 (S68), just like in the above-described step 47, the system is reset (restarted). The system thereby starts by the program after update. At this time, the system starts according to the setting in Step 67.

The update operation of data in the secret area is described above. As described above, when the value of the effective bank setting flag is any of 0 and 1 at the start of the flow of the update operation, it is possible to implement the update according to the flow of the update operation shown in FIG. 20. The program that is needed to implement the flow can be thereby used in common regardless of the value of the effective bank setting flag at the time of update.

In the case of updating a part of the program storage area 710 other than the secret area in the nonvolatile memory 700 in 2-bank structure, it is necessary to copy the contents of the secret area 711_0 of bank0 to the secret area 711_1 of bank1 and further write new data to bank1, which is the reserved area. In this embodiment, even in the case of updating a part of the program storage area 710 other than the secret area in the nonvolatile memory 700 in 2-bank structure, it is not possible to read data in the secret area and copy it to the reserved area unless knowing authentication information for access to the secret area. Therefore, for example, when a person who updates an area other than the secret area is different from a person who updates the secret area, the person who updates an area other than the secret area cannot copy the contents of the secret area 711_0 to the secret area 711_1, which is a problem. Such a problem can be avoided by placing new data in both of the secret area 711_0 and the secret area 711_1 when updating the secret area. Specifically, when updating the secret area, it is preferred to perform the flow of the update operation shown in FIG. 20 twice. For example, when the value of the effective bank setting flag before the start of update is 1, it is preferred to store new data into the secret area 711_1 of bank1 that is implemented by the flash memory macro 250B in the flow of the update operation performed first time and then store new data into the secret area 711_1 of bank1 that is implemented by the flash memory macro 250A in the flow of the update operation performed second time. Further, when the value of the effective bank setting flag before the start of update is 0, it is preferred to store new data into the secret area 711_1 of bank1 that is implemented by the flash memory macro 250A in the flow of the update operation performed first time and then store new data into the secret area 711_1 of bank1 that is implemented by the flash memory macro 250B in the flow of the update operation performed second time. In this manner, the person who updates an area other than the secret area does not need to copy the contents of the secret area 711_0 of bank0 to bank1 in the case of updating an area other than the secret area.

Figure 21:
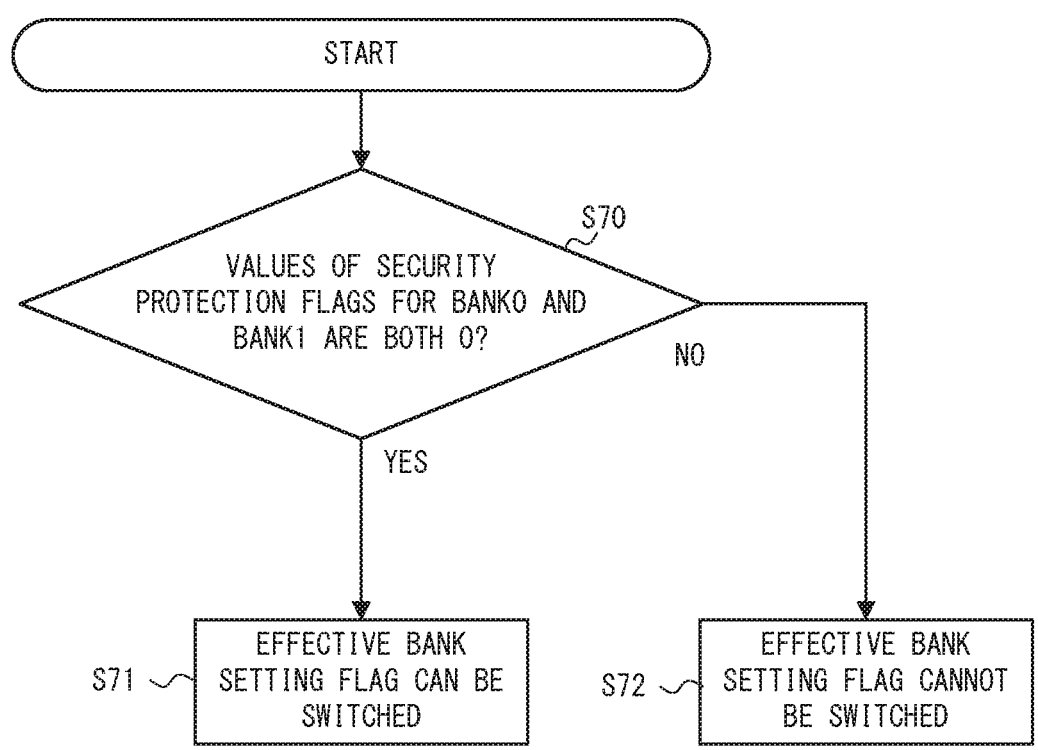
FIG. 21 is a flowchart showing a flow to determine whether to switch an effective bank setting flag according to the second embodiment.

The switching of the effective bank is further described next. FIG. 21 is a flowchart showing a flow to determine whether to switch the effective bank setting flag. The flow to determine whether to switch the effective bank setting flag is described hereinafter with reference to FIG. 21.

In Step 70 (S70), the memory controller 500 determines whether the values of the security protection flags for bank0 and bank1 are both 0. When the values of the security protection flags for bank0 and bank1 are both 0, the process proceeds to Step 71. On the other hand, when at least one of the values of the security protection flags for bank0 and bank1 is 1, the process proceeds to Step 72.

In Step 71 (S71), the memory controller 500 determines that it is possible to switch the value of the effective bank setting flag.

In Step 72 (S72), the memory controller 500 determines that it is not possible to switch the value of the effective bank setting flag.

If the effective bank is switched when the secret area of only one bank is protected, reading of data that has been in the secret area of the other bank which is not protected is enabled. Thus, this is prevented by allowing the switching of the effective bank setting flag only when the value of the security protection flag for bank0 is 0 and the value of the security protection flag for bank1 is also 0 as shown in FIG. 21.

Figure 22:
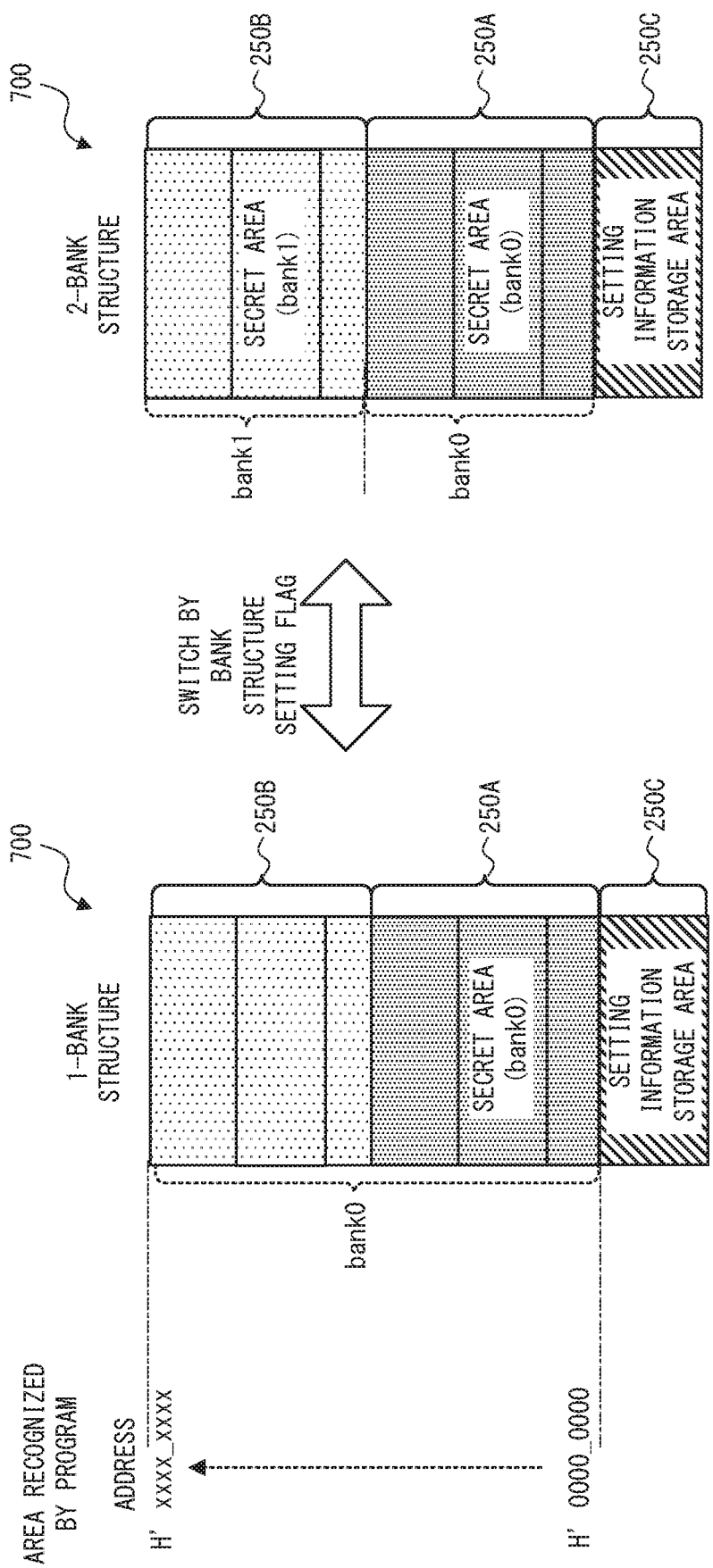
FIG. 22 is a schematic diagram showing switching of a bank structure according to the second embodiment.

Finally, the switching of the bank structure in the nonvolatile memory 700 is described. FIG. 22 is a schematic diagram showing the switching of the bank structure. As shown in FIG. 22, by switching the bank structure setting flag, the nonvolatile memory 700 can switch the bank structure from 1-bank structure to 2-bank structure and from 2-bank structure to 1-bank structure. Note that, in the example of FIG. 22, the program storage area 710 is implemented by a flash memory macro 250A and a flash memory macro 250B, and the setting information storage area 720 is implemented by a flash memory macro 250C.

Figure 23:
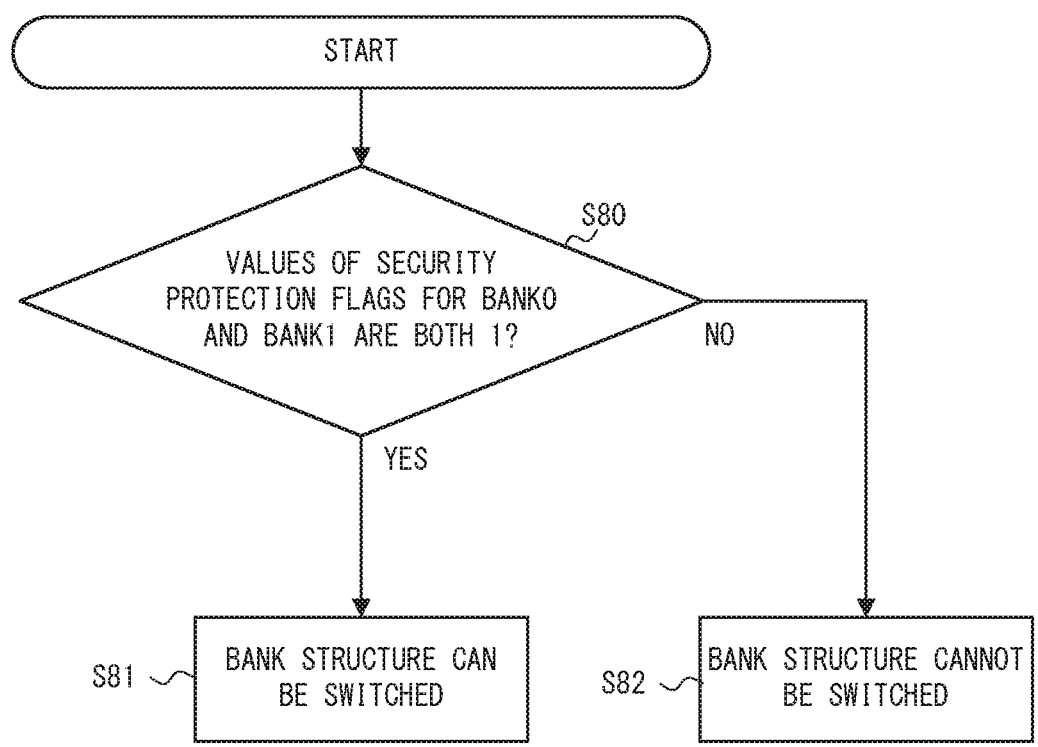
FIG. 23 is a flowchart showing a flow to determine whether to switch a bank structure according to the second embodiment.

FIG. 23 is a flowchart showing a flow to determine whether to switch the bank structure. The bank structure switching determination flow is described hereinafter with reference to FIG. 23.

In Step 80 (S80), the memory controller 500 determines whether the values of the security protection flags for bank0 and bank1 are both 1. When the values of the security protection flags for bank0 and bank1 are both 1, the process proceeds to Step 81. On the other hand, when at least one of the values of the security protection flags for bank0 and bank1 is 0, the process proceeds to Step 82.

In Step 81 (S81), the memory controller 500 determines that it is possible to switch the value of the bank structure setting flag.

In Step 82 (S82), the memory controller 500 determines that it is not possible to switch the value of the bank structure setting flag.

In the 2-bank structure, when the value of the security protection flag for bank1 is 0 (i.e., in the state where a program with a high level of secrecy is stored in the secret area 711_1 of bank1), reading of data that exists in the secret area 711_1 of bank1 is enabled as a result that the bank structure changes from 2-bank structure to 1-bank structure. Further, when, in the area that becomes the secret area 711_1 of bank1 in the 2-bank structure, a program with a low level of secrecy is stored when it is in the 1-bank structure, writing and reading of data in that area are disabled as a result that the bank structure changes from 1-bank structure to 2-bank structure in the state where the value of the security protection flag for bank1 is 0. The occurrence of those problems can be avoided by allowing switching of the bank structure setting flag only when the value of the security protection flag for bank0 is 1 and the value of the security protection flag for bank1 is also 1.

The second embodiment is described above. According to this embodiment, it is possible to improve the security in the secret area, as in the first embodiment. Further, because the nonvolatile memory 700 is in 2-bank structure, there is an advantage that it is not necessary to copy a ROM program to another memory such as the RAM 600 before update. Furthermore, because an update program is written into one of the two banks which serves as a reserved area, there is an advantage that the system can start without being affected in the event of system reset due to instantaneous power interruption or the like.

Modified Example of Second Embodiment

A modified example of the second embodiment is described hereinafter. The same modification as in the modified example of the first embodiment can be made to the second embodiment. Specifically, in this modified example, the memory controller 500 determines whether or not to allow access as shown in FIG. 24. Because the same modification as in the modified example of the first embodiment is made to the second embodiment in this modified example, the detailed description thereof is omitted.

Figure 25:
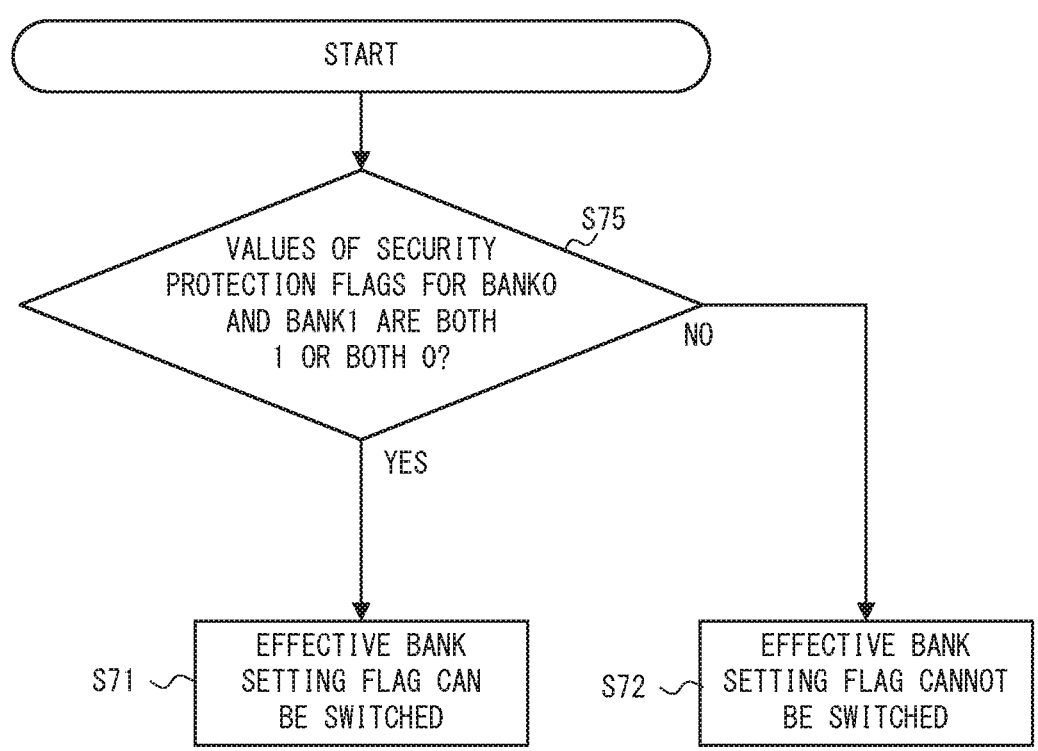
FIG. 25 is a flowchart showing a flow to determine whether to switch an effective bank setting flag according to a modified example of the second embodiment.

Note that, in the application of the semiconductor device 20 that does not use secret information, the value of the security protection flag for bank0 and the value of the security protection flag for bank1 are both set to 1, and in order to implement switching of the bank in this case also, the flow to determine switching of the effective bank setting flag shown in FIG. 25 is used instead of the flow to determine switching of the effective bank setting flag shown in FIG. 21 in this modified example. Specifically, Step 70 in the flowchart of FIG. 21 is replaced by Step 75 (S75). In Step 75, the memory controller 500 determines whether the values of the security protection flags for bank0 and bank1 are both 1 or both 0. Then, when the values of the security protection flags for bank0 and bank1 are both 1, or when the values of the security protection flags for bank0 and bank1 are both 0, the process proceeds to Step 71. On the other hand, when the value of the security protection flag for bank0 and the value of the security protection flag for bank1 are different, the process proceeds to Step 72.

Third Embodiment

The third embodiment is described hereinafter. This embodiment is different from the above-described embodiment in that erasure of data in the secret area is also protected by the authentication function. In the following description, differences from the second embodiment are specifically described, and the description of the same structures or operations as in the second embodiment is omitted as appropriate.

When the value of the flag information is a specified value and the validity of access is authenticated by the authentication controller 400, the memory controller 500 according to this embodiment allows erasure in the secret area. To be specific, for example, the memory controller 500 determines whether or not to erase data in the secret area in the following way. FIG. 26 is a table showing conditions for determination as to whether or not to allow access which is made by the memory controller 500 according to the third embodiment. Note that because this embodiment is different from another embodiment only in that the memory controller 500 determines whether or not to allow erasure in the secret area, determination of the memory controller 500 as to whether or not to allow erasure in the secret area is described hereinafter.

As shown in FIG. 26, the memory controller 500 according to this embodiment inhibits erasure for the secret area 711_0 of bank0. Further, when the value of the reading control flag is 1, the memory controller 500 according to this embodiment inhibits erasure of data in the secret area 711_1 of bank1 regardless of the value of the security protection flag. On the other hand, when the value of the security protection flag for bank1 is 1 and the value of the reading control flag is 0, the memory controller 500 according to this embodiment determines whether or not to allow erasure of data in the secret area 711_1 depending on a result of authentication by the authentication controller 400. Further, when the value of the security protection flag for bank1 is 0 and the value of the reading control flag is 0, the memory controller 500 according to this embodiment determines whether or not to allow erasure of data in the secret area 711_1 depending on a result of authentication by the authentication controller 400.

Figure 27:
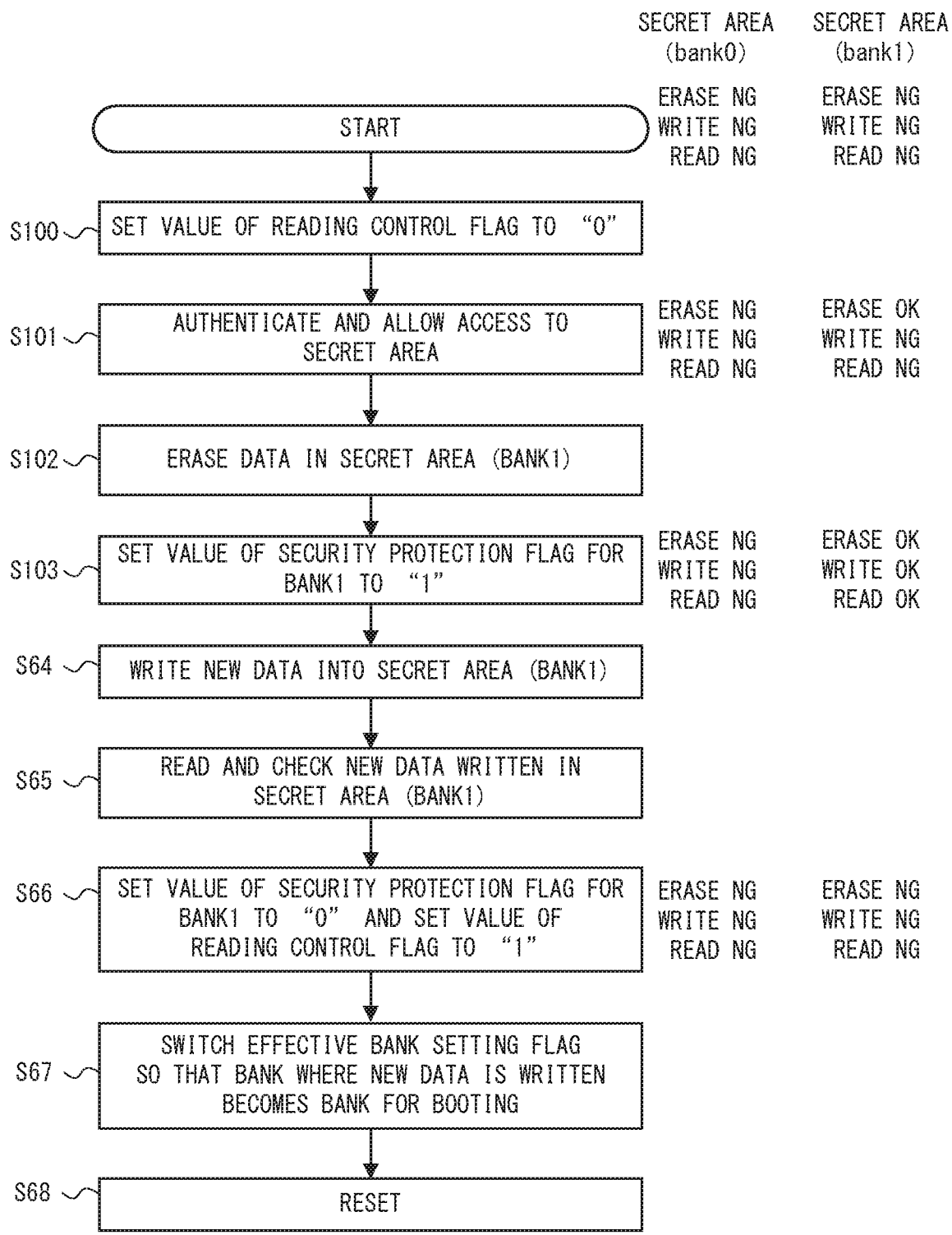
FIG. 27 is a flowchart showing an example of the operation to update data in a secret area according to the third embodiment.

The operation to update data in the secret area in the semiconductor device 20 according to this embodiment is described hereinafter. FIG. 27 is a flowchart showing an example of the operation to update data in the secret area according to the third embodiment. Note that, in FIG. 27, next to a step in the flowchart, whether access to the secret areas 711_0 and the secret area 711_1 is enabled or not when that step is performed is shown. Hereinafter, the operation to update data in the secret area is described with reference to FIG. 27.

The setting values of flag information before the update operation is performed are as follows. Specifically, the value of the security protection flag for bank0 and the value of the security protection flag for bank1 are 0, and the value of the reading control flag is 1. Thus, in this state, erasure, writing and reading in the secret area 711_1 are inhibited. Note that, erasure, writing and reading in the secret area 711_0 remain to be inhibited in the update operation.

In Step 100 (S100), like in Step 62 shown in FIG. 20, the memory controller 500 sets the value of the reading control flag to 0. Note that, even after the value of the reading control flag is changed to 0, the state where erasure, writing and reading in the secret area 211 are inhibited continues.

In Step 101 (S101), authentication by the authentication controller 400 is performed, just like in Step 63 shown in FIG. 20. When authentication is successful, the memory controller 500 allows erasure in the secret area 711_1. Note that, although the case where authentication is successful is shown as an example in the flowchart of FIG. 27, in the case where authentication is failed, the state where erasure is inhibited continues.

In Step 102 (S102), just like in Step 60 shown in FIG. 20, data of the secret area 711_1 is erased. The memory controller 500 thereby detects erasure in the secret area 711_1, and determines that the value of the security protection flag can be set to 1 and determines that the value of the reading control flag can be set to 0.

In Step 103 (S103), just like in Step 61 shown in FIG. 20, the memory controller 500 sets the value of the security protection flag for bank1 to 1. Writing and reading in the secret area 711_1 are thereby allowed.

The processing steps after Step 64 in FIG. 20 are performed after that.

According to this embodiment, it is also possible to prevent falsification by data erasure in the secret area. Note that, although the case where the structure that uses authentication for data erasure in the secret area is applied to the semiconductor device 20 according to the second embodiment is described as an example in this embodiment, that structure may be applied to the semiconductor device according to the first embodiment or may be applied to the semiconductor device according to each of the above-described modified examples.

Although the invention accomplished by the present inventor is specifically described using several embodiments in the foregoing, the present invention is not restricted to the above-described embodiments, and various changes and modifications may be made without departing from the scope of the invention. For example, although the values of each flags are 0 and 1 in the above-described embodiments, those values are just an example, and each flag may have two values (for example, a first value and a second value) as possible values. Accordingly, the value of each flag is not limited to 1 bit. Further, although the case where the nonvolatile memory is in 2-bank structure is described in the second embodiment, the nonvolatile memory may be composed of a plurality of, i.e., three or more, banks. In this case, any one of the plurality of banks serves as an area where a boot program is to be stored, and another at least one of the plurality of banks serves as a reserved area.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An information processing apparatus comprising:
   a nonvolatile memory that has a secret area where secret information is stored;
   an authentication controller configured to authenticate access to the nonvolatile memory and generate an authentication result;
   a flag information storage configured to store 1) first flag information that indicates an allowability or an inhibition of writing to the secret area of the nonvolatile memory and 2) second flag information that indicates an allowability or an inhibition of reading from the secret area of the nonvolatile memory; and
   a memory controller configured to control access to the nonvolatile memory based on 1) the first flag information, 2) the second flag information, and 3) the authentication result of the authentication controller,
   wherein the memory controller allows reading of the secret information from the secret area when 1) the first flag information indicates the allowability of writing to the secret area of the nonvolatile memory, 2) the second flag information indicates the allowability of reading from the secret area of the nonvolatile memory, and 3) the authentication result authenticates access to the nonvolatile memory, and
   wherein the memory controller inhibits reading of the secret information from the secret area when 1) the first flag information indicates the inhibition of writing to the secret area of the nonvolatile memory, 2) the second flag information indicates the allowability of reading from the secret area of the nonvolatile memory, and 3) the authentication result authenticates access to the nonvolatile memory.

2. The information processing apparatus according to claim 1, wherein the memory controller changes a value of the first flag information from a value inhibiting writing to the secret area of the nonvolatile memory to a value allowing writing to the secret area of the nonvolatile memory when contents of the secret area are erased.

3. The information processing apparatus according to claim 1, wherein the nonvolatile memory is composed of one bank.

4. The information processing apparatus according to claim 1, wherein
   the nonvolatile memory is composed of a plurality of banks,
   the first flag information storage further stores an effective bank setting flag for specifying an effective bank among the plurality of banks, and
   when new secret information is written into the secret area of a bank that is not currently effective, the memory controller changes the effective bank setting flag so that the bank becomes an effective bank.

5. The information processing apparatus according to claim 2, wherein the memory controller allows erasure in the secret area when 1) a value of the first flag information is a value allowing writing to the secret area of the nonvolatile memory and 2) the authentication result authenticates access to the nonvolatile memory.

6. The information processing apparatus according to claim 1, wherein the flag information storage is included in the nonvolatile memory, and the flag information is stored in an area other than the secret area of the nonvolatile memory.

7. A reading control method comprising:
   storing 1) first flag information to be used for determining whether to allow or inhibit writing to a secret area of a nonvolatile memory, and 2) second flag information to be used for determining whether to allow or inhibit reading from the secret area of the nonvolatile memory, the secret area storing secret information;
   determining whether to authenticate access to the nonvolatile memory, authenticating access to the nonvolatile memory, and generating an authentication result;
   allowing reading of the secret information from the secret area when 1) the first flag information indicates the allowability of writing to the secret area of the nonvolatile memory, 2) the second flag information indicates the allowability of reading from the secret area of the nonvolatile memory, and 3) the authentication result authenticates access to the nonvolatile memory; and
   inhibiting reading of the secret information from the secret area when 1) the first flag information indicates the inhibition of writing to the secret area of the nonvolatile memory, 2) the second flag information indicates the allowability of reading from the secret area of the nonvolatile memory, and 3) the authentication result authenticates access to the nonvolatile memory.

* * * * *